US011704586B2

(12) United States Patent
Thom et al.

(10) Patent No.: US 11,704,586 B2
(45) Date of Patent: *Jul. 18, 2023

(54) SYSTEMS AND METHODS FOR ANALOG PROCESSING OF PROBLEM GRAPHS HAVING ARBITRARY SIZE AND/OR CONNECTIVITY

(71) Applicant: D-WAVE SYSTEMS INC., Burnaby (CA)

(72) Inventors: Murray C. Thom, Vancouver (CA); Aidan P. Roy, Surrey (CA); Fabian A. Chudak, Vancouver (CA); Zhengbing Bian, Burnaby (CA); William G. Macready, West Vancouver (CA); Robert B. Israel, Richmond (CA); Kelly T. R. Boothby, Vancouver (CA); Sheir Yarkoni, Vancouver (CA); Yanbo Xue, Toronto (CA); Dmytro Korenkevych, Burnaby (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,411

(22) Filed: May 9, 2022

(65) Prior Publication Data
US 2022/0335320 A1 Oct. 20, 2022

Related U.S. Application Data

(63) Continuation of application No. 16/778,295, filed on Jan. 31, 2020, now Pat. No. 11,348,026, which is a
(Continued)

(51) Int. Cl.
*G06N 10/00* (2022.01)

(52) U.S. Cl.
CPC .................................. *G06N 10/00* (2019.01)

(58) Field of Classification Search
CPC ........ G06N 10/00; G06N 10/20; G06N 10/40; G06N 10/60; G06N 10/80
See application file for complete search history.

(56) References Cited

U.S. PATENT DOCUMENTS

| 1,102,227 A | 7/1914 | Baird |
| 7,135,701 B2 | 11/2006 | Amin et al. |
(Continued)

FOREIGN PATENT DOCUMENTS

| KR | 20160132943 A | 11/2016 |
| KR | 20180067006 A | 6/2018 |
(Continued)

OTHER PUBLICATIONS

Non-Final Office Action dated Jun. 3, 2022 in U.S. Appl. No. 16/741,208.
(Continued)

*Primary Examiner* — Merilyn P Nguyen
(74) *Attorney, Agent, or Firm* — Cozen O'Connor

(57) ABSTRACT

Computational systems implement problem solving using hybrid digital/quantum computing approaches. A problem may be represented as a problem graph which is larger and/or has higher connectivity than a working and/or hardware graph of a quantum processor. A quantum processor may be used determine approximate solutions, which solutions are provided as initial states to one or more digital processors which may implement classical post-processing to generate improved solutions. Techniques for solving problems on extended, more-connected, and/or "virtual full yield" variations of the processor's actual working and/or hardware graphs are provided. A method of operation in a computational system comprising a quantum processor
(Continued)

includes partitioning a problem graph into sub-problem graphs, and embedding a sub-problem graph onto the working graph of the quantum processor. The quantum processor and a non-quantum processor-based device generate partial samples. A controller causes a processing operation on the partial samples to generate complete samples.

12 Claims, 19 Drawing Sheets

Related U.S. Application Data continuation of application No. 15/448,361, filed on Mar. 2, 2017, now Pat. No. 10,599,988.

(60) Provisional application No. 62/375,785, filed on Aug. 16, 2016, provisional application No. 62/302,544, filed on Mar. 2, 2016.

(56) References Cited

U.S. PATENT DOCUMENTS

| | | | |
|---|---|---|---|
| 7,369,035 B2 | 5/2008 | Konno et al. | |
| 7,398,162 B2 | 7/2008 | Downs et al. | |
| 7,398,163 B2 | 7/2008 | Tsukamoto et al. | |
| 7,418,283 B2 | 8/2008 | Amin | |
| 7,533,068 B2 | 5/2009 | Maassen et al. | |
| 7,619,437 B2 | 11/2009 | Thom et al. | |
| 7,624,088 B2 | 11/2009 | Johnson et al. | |
| 7,639,035 B2 | 12/2009 | Berkley | |
| 7,870,087 B2 | 1/2011 | Macready et al. | |
| 7,870,523 B1 | 1/2011 | Uziel et al. | |
| 7,876,248 B2 | 1/2011 | Berkley et al. | |
| 7,898,282 B2 | 3/2011 | Harris et al. | |
| 7,984,012 B2 | 7/2011 | Coury et al. | |
| 8,008,942 B2 | 8/2011 | Van et al. | |
| 8,035,540 B2 | 10/2011 | Berkley et al. | |
| 8,063,657 B2 | 11/2011 | Rose | |
| 8,073,808 B2 * | 12/2011 | Rose | G06V 10/94 706/62 |
| 8,175,995 B2 * | 5/2012 | Amin | G06F 15/16 706/45 |
| 8,190,548 B2 * | 5/2012 | Choi | B82Y 10/00 706/46 |
| 8,195,596 B2 | 6/2012 | Rose et al. | |
| 8,195,726 B2 | 6/2012 | Macready et al. | |
| 8,283,943 B2 | 10/2012 | Van Den Brink et al. | |
| 8,421,053 B2 | 4/2013 | Bunyk et al. | |
| 8,437,818 B1 | 5/2013 | Tolpygo et al. | |
| 8,464,542 B2 | 6/2013 | Hilton et al. | |
| 8,494,993 B2 | 7/2013 | Harris et al. | |
| 8,772,759 B2 | 7/2014 | Bunyk et al. | |
| 9,170,278 B2 | 10/2015 | Neufeld | |
| 9,178,154 B2 | 11/2015 | Bunyk | |
| 9,183,508 B2 | 11/2015 | King | |
| 9,501,747 B2 * | 11/2016 | Roy | G06N 20/00 |
| 9,727,824 B2 | 8/2017 | Rose et al. | |
| 9,875,444 B2 | 1/2018 | King | |
| 9,898,689 B2 | 2/2018 | Shamaie | |
| 10,031,887 B2 | 7/2018 | Raymond | |
| 10,169,445 B2 | 1/2019 | Weinstein et al. | |
| 10,268,622 B2 | 4/2019 | Hilton et al. | |
| 10,346,508 B2 | 7/2019 | Amin et al. | |
| 10,552,755 B2 | 2/2020 | Lanting et al. | |
| 10,599,988 B2 | 3/2020 | Thom et al. | |
| 10,846,366 B1 | 11/2020 | Otterbach et al. | |
| 11,062,227 B2 | 7/2021 | Amin et al. | |
| 11,194,573 B1 | 12/2021 | Smith | |
| 11,288,121 B2 | 3/2022 | Katabarwa | |
| 11,481,354 B2 | 10/2022 | Ozfidan | |
| 2002/0163518 A1 | 11/2002 | Rising et al. | |
| 2003/0121028 A1 | 6/2003 | Coury et al. | |
| 2003/0169041 A1 | 9/2003 | Coury et al. | |
| 2005/0224784 A1 | 10/2005 | Amin et al. | |
| 2006/0225165 A1 | 10/2006 | Maassen et al. | |
| 2007/0174227 A1 * | 7/2007 | Johnson | G06N 10/00 706/62 |
| 2007/0239366 A1 | 10/2007 | Hilton et al. | |
| 2008/0065573 A1 | 3/2008 | Macready | |
| 2008/0109500 A1 * | 5/2008 | Macready | B82Y 10/00 708/2 |
| 2008/0116449 A1 * | 5/2008 | Macready | G06N 10/00 257/31 |
| 2008/0176750 A1 * | 7/2008 | Rose | B82Y 10/00 505/170 |
| 2008/0218519 A1 * | 9/2008 | Coury | G06T 11/206 345/440 |
| 2008/0313430 A1 | 12/2008 | Bunyk | |
| 2009/0070402 A1 | 3/2009 | Rose et al. | |
| 2009/0075825 A1 | 3/2009 | Rose et al. | |
| 2009/0077001 A1 * | 3/2009 | Macready | G06N 5/02 706/57 |
| 2009/0232191 A1 | 9/2009 | Gupta et al. | |
| 2009/0299947 A1 | 12/2009 | Amin et al. | |
| 2010/0275206 A1 | 10/2010 | Mewhinney et al. | |
| 2010/0281885 A1 | 11/2010 | Black et al. | |
| 2011/0022820 A1 | 1/2011 | Bunyk et al. | |
| 2011/0060710 A1 | 3/2011 | Amin | |
| 2011/0065585 A1 | 3/2011 | Lanting et al. | |
| 2011/0231462 A1 | 9/2011 | Macready et al. | |
| 2011/0298489 A1 | 12/2011 | Van et al. | |
| 2013/0117200 A1 | 5/2013 | Thom | |
| 2013/0282636 A1 | 10/2013 | Macready et al. | |
| 2014/0025606 A1 | 1/2014 | Macready | |
| 2014/0187427 A1 | 7/2014 | Macready et al. | |
| 2014/0214257 A1 | 7/2014 | Williams et al. | |
| 2014/0223224 A1 | 8/2014 | Berkley | |
| 2014/0250288 A1 * | 9/2014 | Roy | G06N 5/01 712/223 |
| 2014/0337612 A1 | 11/2014 | Williams | |
| 2015/0006443 A1 | 1/2015 | Rose et al. | |
| 2015/0032993 A1 | 1/2015 | Amin et al. | |
| 2015/0032994 A1 | 1/2015 | Chudak et al. | |
| 2015/0269124 A1 | 9/2015 | Hamze et al. | |
| 2015/0297949 A1 | 10/2015 | Aman et al. | |
| 2015/0310350 A1 | 10/2015 | Niskanen et al. | |
| 2015/0358022 A1 | 12/2015 | Mcdermott et al. | |
| 2015/0363708 A1 | 12/2015 | Amin et al. | |
| 2016/0055421 A1 * | 2/2016 | Adachi | G06N 5/01 706/46 |
| 2016/0071021 A1 * | 3/2016 | Raymond | G06F 15/76 712/28 |
| 2016/0321559 A1 | 11/2016 | Rose et al. | |
| 2017/0091650 A1 * | 3/2017 | King | G06N 10/00 |
| 2017/0124027 A1 * | 5/2017 | Zaribafiyan | G06N 5/01 |
| 2017/0177534 A1 | 6/2017 | Mohseni et al. | |
| 2017/0178017 A1 * | 6/2017 | Roy | B82Y 10/00 |
| 2017/0220510 A1 * | 8/2017 | Hilton | G06F 13/36 |
| 2017/0255629 A1 | 9/2017 | Thom et al. | |
| 2017/0255872 A1 | 9/2017 | Hamze et al. | |
| 2017/0300817 A1 | 10/2017 | King et al. | |
| 2017/0323195 A1 | 11/2017 | Crawford et al. | |
| 2018/0046933 A1 | 2/2018 | La Cour et al. | |
| 2018/0091440 A1 | 3/2018 | Dadashikelayeh et al. | |
| 2018/0096085 A1 | 4/2018 | Rubin | |
| 2018/0218279 A1 | 8/2018 | Lechner et al. | |
| 2018/0246848 A1 * | 8/2018 | Douglass | G06N 10/00 |
| 2018/0246851 A1 | 8/2018 | Zaribafiyan et al. | |
| 2018/0260245 A1 | 9/2018 | Smith | |
| 2018/0336166 A1 | 11/2018 | Forster | |
| 2018/0365585 A1 | 12/2018 | Smith et al. | |
| 2019/0019101 A1 | 1/2019 | Neven | |
| 2019/0164059 A1 * | 5/2019 | Denchev | G06N 3/126 |
| 2019/0164076 A1 * | 5/2019 | Kim | G06N 10/00 |
| 2020/0005186 A1 | 1/2020 | Romero et al. | |
| 2020/0026551 A1 | 1/2020 | Ducore et al. | |
| 2020/0027029 A1 | 1/2020 | Linvill | |
| 2020/0073739 A1 | 3/2020 | Rungta et al. | |
| 2020/0089832 A1 | 3/2020 | Shao et al. | |
| 2020/0117511 A1 | 4/2020 | Reinhardt | |
| 2020/0134502 A1 | 4/2020 | Anschuetz et al. | |
| 2020/0175413 A1 | 6/2020 | Hsu et al. | |

(56) References Cited

U.S. PATENT DOCUMENTS

| | | | |
|---|---|---|---|
| 2020/0226197 | A1 | 7/2020 | Woerner et al. |
| 2020/0234172 | A1 | 7/2020 | King et al. |
| 2020/0302306 | A1 | 9/2020 | Matsuo et al. |
| 2020/0311591 | A1 | 10/2020 | Bernoudy et al. |
| 2021/0056003 | A1 | 2/2021 | Stevanovic |
| 2021/0097776 | A1 | 4/2021 | Faulkner et al. |
| 2021/0334081 | A1 | 10/2021 | Chong et al. |
| 2021/0357797 | A1 | 11/2021 | Karalekas et al. |
| 2022/0019928 | A1 | 1/2022 | Jiang et al. |

FOREIGN PATENT DOCUMENTS

| | | | |
|---|---|---|---|
| WO | 2005093649 | A1 | 10/2005 |
| WO | 2007085074 | A1 | 8/2007 |
| WO | 2009152180 | A2 | 12/2009 |
| WO | 2012064974 | A2 | 5/2012 |
| WO | 2013006836 | A1 | 1/2013 |
| WO | 2014123980 | A1 | 8/2014 |
| WO | 2015143439 | A1 | 9/2015 |
| WO | 2016029172 | A1 | 2/2016 |
| WO | 2016182608 | A2 | 11/2016 |
| WO | 2017214331 | A1 | 12/2017 |
| WO | 2018119522 | A1 | 7/2018 |
| WO | 2021126773 | A1 | 6/2021 |
| WO | 2022219399 | A1 | 10/2022 |

OTHER PUBLICATIONS

Notice of Allowance for U.S. Appl. No. 16/830,650, dated Jul. 15, 2022, 11 pages.
Amin, "Effect of Local Minima on Adiabatic Quantum Optimization," Physical Review Letters 100(130503), 2008, 4 pages.
B. Bauer et al, "Hybrid Quantum Classical Approach to Correlated Materials", arXiv.1510.03859V2, Aug. 29, 2016.
Booth, M. et al., "Partitioning Optimization Problems for Hybrid Classical/Quantum Execution," D-Wave Technical Report, Jan. 9, 2017, 13 pages.
E. Blanzieri et al., "Quantum Annealing Tabu Search for QUBO Optimization", arXiv.1810.09342V1, Oct. 22, 2018.
Inoue et al. "Simulation and Experimental Demonstration of Logic Circuits Using an Ultra-Low-Power Adiabatic Quantum-Flux-Parametron," in IEEE Transactions on Applied Superconductivity, vol. 23, No. 3, pp. 1301105-1301105, Jun. 2013.
International Search Report and Written Opinion for PCT/US2020/013366, dated May 7, 2020, 9 pages.
Wocjan, Pawel, and Anura Abeyesinghe. "Speedup via quantum sampling." Physical Review A 78.4 (2008): 042336.
Non-Final Office Action Issued in U.S. Appl. No. 16/601,097 dated Apr. 8, 2022, 22 pages.
Non-Final Office Action Issued in U.S. Appl. No. 16/778,295 dated May 26, 2022, 13 pages.
Notice of Allowance dated Feb. 2, 2022, for Thom, "Systems and Methods for Analog Processing of Problem Graphs Having Arbitrary Size and/or Connectivity" U.S. Appl. No. 16/778,295; 29 pages.
O. A. Mukhanov, "Energy-Efficient Single Flux Quantum Technology," in IEEE Transactions on Applied Superconductivity, vol. 21, No. 3, pp. 760-769, Jun. 2011, doi: 10.1109/TASC.2010.2096792.
Pastorello, D. et al., "Quantum Annealing Learning Search for Solving QUBO Problems," arXiv:1810.09342v3 [quant-ph] Aug. 13, 2019, 17 pages.
S. R. Ekanayake, T. Lehmann, A. S. Dzurak and R. G. Clark, "Quantum bit controller and observer circuits in SOS-CMOS technology for gigahertz low-temperature operation," 2007 7th IEEE Conference on Nanotechnology (IEEE NANO), 2007, pp. 1283-1287.
Tran, T. et al., "A Hybrid Quantum-Classical Approach to Solving Scheduling Problems," Proceedings of the Ninth International Symposium on Combinational Search, 2016, 9 pages.
Williams, "Systems and Methods for Interacting With a Quantum Computing System," U.S. Appl. No. 61/811,457, filed Apr. 12, 2013, 55 pages.
"Cliquer—routines for clique searching," 2002, retrieved from https://users.aalto.fi/-pat /cliquer.html , retrieved on Mar. 2, 2017, 2 pages.
Bass, G. et al., "Heterogeneous Quantum Computing for Satellite Constellation Optimization: Solving the Weighted K-Clique Problem", arXiv: 1709.05381v3, May 20, 2018. 17 pages.
Bian et al., "Discrete optimization using quantum annealing on sparse Ising models", Frontiers in Physics, Sep. 18, 2014.
Final Office Action dated Dec. 9, 2022 for U.S. Appl. No. 16/997,252 in 11 pages.
Kingma et al., "Adam: A method for stochastic optimization", arXiv:1412.6980 Jan. 30, 2017. https://arxiv.org/abs/1412.6980.
Neal, "Slice Sampling", The Annals of Statistics, 2003, vol. 31, No. 3, p. 705-767.
Pudenz, "Parameter Setting for Quantum Annealers," arXiv:1611.07552v1 [ quant-ph], Nov. 22, 2016, 6 pages.
Rios, et al., "Derivative-free optimization: a review of algorithms and comparison of software implementations". Springer Science+Business Media, LLC. 2012, J Glob Optim (2013) 56:1247-1293.
Spall, "A Stochastic Approximation Technique for Generating Maximum Likelihood Parmeter Estimates", Proceedings of the 1987 American Control Conference, Minneapolis, Jun. 10-12, 1987.
Spall, "An Overview of the Simultaneous Perturbation Method for Efficient Optimization", Johns Hopkins APL Technical Digest, vol. 9, No. 4, pp. 482-492, 1998.
Spall, "Multivariate Stochastic Approximation Using a Simultaneous Perturbation Gradient Approximation," IEEE Transactions on Automatic Control 37(3):332-341, 1992.
Ajagekar, et al., "Quantum computing for energy systems optimization: Challenges and opportunities" May 2, 2019, 34 pages.
Congram et al., "An Iterated Dynasearch Algorithm for the Single-Machine Total Weighted Tardiness Scheduling Program," INFORMS Journal on Computing, vol. 14, No. 1, 2022 (17 pages).
Goldman, et al., "Parameter-less Population Population Pyramid", Beacon Center for the Study of evolution in Action, 2014, pp. 785-792.
Hamerly, et al., "Scaling advantages of all-to-all connectivity in physical annealers" the Coherent Ising Machine vs. D-Wave 2000Q, ArXiv:1805.052217v1 [quant-ph], May 14, 2018, 17 pages.
International Search Report and Written Opinion for PCT/IB2022/000201 dated Sep. 8, 2022, 15 pages.
Katzgraber et al., "A small -world search for quantum speedup: How small-world interactions can lead to improved quantum annealers designs", arXiv:1805.09510v1 [quant-ph], May 4, 2018, 11 pages.
Notice of Allowance for U.S. Appl. No. 16/601,097, dated Nov. 2, 2022, 9 pages.
Thierens, "The Linkage Tree Genetic Algorithm", R. Schaefer et al. (Eds.): PPSN XI, Part I, LNCS 6238, pp. 264-273, Springer-Verlag Berlin Heidelberg 2010.

* cited by examiner

SYSTEMS AND METHODS FOR ANALOG PROCESSING OF PROBLEM GRAPHS HAVING ARBITRARY SIZE AND/OR CONNECTIVITY

TECHNICAL FIELD

This disclosure generally relates to solving problems represented in graph form via analog processors, and may particularly be useful in quantum computing via quantum processors.

BACKGROUND

At least some analog processors (e.g., quantum processors) provide a plurality of analog computation devices (e.g., qubits) which are controllably coupled to each other by couplers. Problems may be "embedded" on the processor for computation (e.g., by representing the problems as problem graphs where vertices and edges correspond to computation devices and couplers, respectively). The number of physical computation devices and couplers provided by the processor is often limited, which constrains the size (in terms of vertices) and connectivity (in terms of edges) of problem graphs which may be conveniently embedded on the analog processor.

This constraint is a significant driver in the ongoing effort to develop ever-larger (in terms of computing devices) and more connected (in terms of couplers) analog processors. Such analog processors are generally capable of having larger and/or more connected problem graphs embedded on them and thus may be capable of solving a greater scope of problems. However, obtaining larger and/or more connected analog processors may involve substantial costs and/or may not even be possible at a particular time (e.g., because such a processor has yet to be designed or manufactured).

Other approaches can involve finding embeddings which more efficiently represent problems on the analog processor. For many combinations of problems and not-fully-connected processors, the process of embedding the problems on the processor involves some overhead in the form of requiring the use of additional computation devices and/or couplers. Some embedding algorithms may require less overhead than other embedding algorithms for a given processor/problem pair, and so finding appropriate embedding algorithms may expand the scope of problems which are representable on a given processor. However, such techniques are still bounded by the size and/or connectivity of the processor.

Examples of embedding techniques are provided in, for example, U.S. Pat. No. 7,984,012 and Discrete optimization using quantum annealing on sparse Ising models, Bian et al., Front. Phys., 18 Sep. 2014, DOI: 10.3389/fphy.2014.00056.

There is thus a general desire for systems and methods for expanding the set of problems which may be solved by a particular analog processor.

Some approaches employ interactions between an analog processor and a digital computing system. These approaches are described herein as hybrid approaches. For example, in an iterative method, an analog processor, such as a quantum computing system, may be designed, operated, and/or adapted to provide a rate of convergence that is greater than the rate of convergence of a digital computing system.

Examples of hybrid approaches are provided in, for example, US Patent Application Publication No. 2014-0337612 entitled Systems and Methods for Interacting with a Quantum Computing System.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to be able to processor at least some problems having size and/or connectivity greater than (and/or at least not fully provided by) the working graph of an analog processor. Computational systems and methods are described which, at least in some implementations, allow for the computation of at least some problem graphs which have representations which do not fit within the working graph of an analog processor (e.g., because they require more computation devices and/or more/other couplers than the processor provides).

A method of operation in a computational system, the computational system may include a quantum processor comprising a plurality of qubits and one or more coupling devices arranged to form a working graph for embedding a problem graph, the computational system may further include at least one non-quantum processor-based device, the method may be summarized as including: receiving a problem represented as a problem graph having a number of decision variables, the problem graph is at least one of larger than the working graph or has a connectivity that is higher than a connectivity of the working graph; for a number of iterations i to a number n where n is a positive integer: partitioning the problem graph into a plurality of sub-problem graphs, each sub-problem graph embeddable onto the working graph of the quantum processor; for each of the sub-problem graphs: embedding the sub-problem graph onto the working graph; and causing a performing of at least one processing operation by the quantum processor to generate a plurality of samples as potential solutions; and causing, by at least one controller, a performing of at least one post-processing operation on the plurality of samples by the at least one non-quantum processor-based device to generate a set of post-processing results; wherein, for each of the sub-problem graphs, embedding the sub-problem graph onto the working graph comprises setting weights at the boundary of the working graph based at least in part on known information regarding sub-problem graphs which are adjacent the sub-problem graph which is being embedded.

The method may further include: determining whether to further process the results to obtain improved results based at least in part on the set of post-processing results; upon determining to further process the results based at least in part on the set of post-processing results, the $i^{th}$ iteration may further include: providing the set of post processing results as inputs to the quantum processor; and initiating an $(i+1)^{th}$ iteration. Causing a performing of at least one post-processing operation may include causing the non-quantum processor-based device to implement a low-treewidth large neighborhood local search operation on the plurality of samples. A structure of at least one of the sub-problem graphs may be different than a structure of the working graph. The method may further include: prior to partitioning the problem graph into a plurality of sub-problem graphs: providing the problem graph to the at least one non-quantum processor-based device; and causing, by at least one controller, a performing of at least one pre-processing operation on the plurality of samples by the at least one non-quantum processor-based device to generate a set of pre-processing results. Receiving a problem represented as a problem graph may include receiving a problem represented as a problem graph having a K5,5 bipartite graph structure, and the working graph has a $K_{4,4}$ bipartite graph structure. Receiving a problem represented as a problem graph may include receiving a problem represented as a problem graph having a non-bipartite graph structure, and the working graph has a bipartite graph structure. Receiving a problem represented as a problem graph may include receiving a problem represented as a problem graph, and the working graph is a graph minor of the problem graph. Determining whether to further process the results, based at least in part on the set of post-processing results, may include comparing a result to a determined satisfaction condition. Determining whether to further process the results based at least in part on the set of post-processing results may include comparing the number of iterations performed to a defined limit. Causing a performing of at least one post-processing operation by at the least one non-quantum processor-based device may include causing the performing of the at least one post-processing operation by at least one of a microprocessor, a digital signal processor (DSP), a graphical processing unit (GPU), a field programmable gate array (FPGA), and an Application Specific Integrated Circuit (ASIC). Causing a performing of at least one post-processing operation by at least one non-quantum processor-based device may include causing a performing of at least one of: a majority voting post-processing operation, a greedy descent post-processing operation, a variable clamping post-processing operation, a variable branching post-processing operation, a local field voting post-processing operation, a local search to find a local minimum post-processing operation, a Markov Chain Monte Carlo simulation at a fixed temperature post-processing operation, and a Metropolis sampling post-processing operation. The method may further include: sending one or more results from the set of post-processing results to a user by at least one component of the computational system.

A method of operation in a computational system, the computational system comprising a quantum processor may include a plurality of qubits and one or more coupling devices arranged to form a working graph for embedding a problem graph, the computational system may further include at least one non-quantum processor-based device, the method may be summarized as including: receiving a problem represented as a problem graph having a number of decision variables, the problem graph is at least one of larger than the working graph or has a connectivity that is higher than a connectivity of the working graph; generating one or more solutions by: embedding a portion of the problem graph onto the working graph; causing a performing of at least one processing operation by the quantum processor to generate one or more samples as potential solutions based on the working graph; and causing, by at least one controller, a performing of at least one post-processing operation on the one or more samples by the at least one non-quantum processor-based device to generate a set of post-processing results based on the problem graph.

Receiving a problem represented as a problem graph may include receiving a problem represented as a problem graph, and the working graph is a graph minor of the problem graph. Causing a performing of at least one post-processing operation may include causing the non-quantum processor-based device to implement a low-treewidth large neighborhood local search operation on the plurality of samples. The working graph may include a plurality of unit cells arranged in a grid of M rows of unit cells and N columns of unit cells, each of the unit cells may include a plurality of qubits, the method may further include: expanding the working graph by at least one of: a row of unit cells or a column of unit cells. Expanding the working graph may include expanding the working graph by at least one row of unit cells and at least one column of unit cells. Receiving a problem represented as a problem graph may include receiving a problem represented as a problem graph, the working graph is a subset of an ideal hardware graph of the quantum processor, and the problem is represented on the ideal hardware graph of the quantum processor. The method may further include: for a number of iterations i to a number n where n is a positive integer, generating one or more solutions; for each iteration, subsequent to causing a performing of at least one processing operation by the quantum processor to generate one or more samples as potential solutions, identifying at least one portion of the problem graph which is not represented by the working graph; causing a performing of at least one intermediate-processing operation on the one or more samples by the at least one non-quantum processor-based device to generate a set of intermediate-processing results, the set of intermediate-processing results providing one or more initial estimates for the at least one portion of the problem graph which is not represented by the working graph; determining whether to further process the results to obtain improved results based at least in part on the set of post-processing results; upon determining to further process the results based at least in part on the set of post-processing results, the $i^{th}$ iteration may further include: providing the set of post processing results as inputs to the quantum processor; and initiating an $(i+1)^{th}$ iteration.

A computational system may be summarized as including: at least one quantum processor comprising a plurality of qubits and one or more coupling devices arranged to form a working graph for embedding a problem graph; at least one non-quantum post-processing processor-based device; at least one processor-based controller communicatively coupled to the at least one quantum processor and the at least one non-quantum post-processing processor-based device, in operation the at least one processor-based controller: receives a problem represented as a problem graph having a number of decision variables, the problem graph is at least one of larger than the working graph or has a connectivity that is higher than a connectivity of the working graph; for a number of iterations i to a number n where n is a positive integer: partitions the problem graph into a plurality of sub-problem graphs, each sub-problem graph embeddable onto the working graph of the quantum processor; for each of the sub-problem graphs: embeds the sub-problem graph onto the working graph; and causes a performing of at least one processing operation by the quantum processor to generate a plurality of samples as potential solutions; and causes a performing of at least one post-processing operation on the plurality of samples by the at least one non-quantum processor-based device to generate a set of post-processing results; wherein, for each of the sub-problem graphs, the at least one processor-based controller sets weights at the boundary of the working graph based at least in part on known information regarding sub-problem graphs which are adjacent the sub-problem graph which is being embedded.

The at least one processor-based controller may: determine whether to further process the results to obtain improved results based at least in part on the set of post-processing results; upon a determination to further process the results based at least in part on the set of post-processing results, the at least one processor-based controller may: provide the set of post processing results as inputs to the quantum processor; and initiate an $(i+1)^{th}$ iteration. The at least one processor-based controller: may cause the non-quantum processor-based device to implement a low-treewidth large neighborhood local search operation on the plurality of samples. The structure of at least one of the sub-problem graphs may be different than the structure of the working graph. The at least one processor-based controller: prior to partitioning the problem graph into a plurality of sub-problem graphs, may: provide the problem graph to the non-quantum processor-based device; and cause a performing of at least one pre-processing operation on the plurality of samples by the at least one non-quantum processor-based device to generate a set of pre-processing results. The working graph may have a $K_{4,4}$ bipartite graph structure and the problem graph may have a $K_{5,5}$ bipartite graph structure. The working graph may have a bipartite graph structure and the problem graph may have a non-bipartite graph structure. The working graph may be a graph minor of the problem graph. The at least one processor-based controller may: compare a result to a determined satisfaction condition to determine whether to further process the results based at least in part on the set of post-processing results. The at least one processor-based controller may: compare the number of iterations performed to a determined limit to determine whether to further process the results based at least in part on the set of post-processing results. The at least one non-quantum processor-based device may include at least one of a microprocessor, a digital signal processor (DSP), a graphical processing unit (GPU), a field programmable gate array (FPGA), and an Application Specific Integrated Circuit (ASIC). The at least one processor-based controller may: cause a performing of at least one of: a majority voting post-processing operation, a greedy descent post-processing operation, a variable clamping post-processing operation, a variable branching post-processing operation, a local field voting post-processing operation, a local search to find a local minimum post-processing operation, a Markov Chain Monte Carlo simulation at a fixed temperature post-processing operation, and a Metropolis sampling post-processing operation. The computational system may further include: a server, communicatively coupled to the quantum processor, wherein in operation the processor-based controller causes the server to send one or more results from the set of post-processing results to a user.

A computational system may be summarized as including: at least one quantum processor which may include a plurality of qubits and one or more coupling devices arranged to form a working graph for embedding a problem graph; at least one non-quantum post-processing processor-based device; at least one processor-based controller communicatively coupled to the at least one quantum processor and the at least one non-quantum post-processing processor-based device, in operation the at least one processor-based controller: receiving a problem represented as a problem graph having a number of decision variables, the problem graph is at least one of larger than the working graph or has a connectivity that is higher than a connectivity of the working graph; generating one or more solutions by: embedding a portion of the problem graph onto the working graph; causing a performing of at least one processing operation by the quantum processor to generate one or more samples as potential solutions based on the working graph; and causing, by at least one controller, a performing of at least one post-processing operation on the one or more samples by the at least one non-quantum processor-based device to generate a set of post-processing results based on the problem graph.

The working graph may be a graph minor of the problem graph. The at least one processor-based controller may: cause the non-quantum processor-based device to implement a low-treewidth large neighborhood local search operation on the plurality of samples. The working graph may include a plurality of unit cells arranged in a grid of M rows of unit cells and N columns of unit cells, each of the unit cells may include a plurality of qubits, and in operation the at least one processor-based controller may: expand the working graph by at least one of: a row of unit cells or a column of unit cells. The at least one processor-based controller may: expand the working graph by at least one row of unit cells and at least one column of unit cells. The working graph may be a subset of an ideal hardware graph of the quantum processor, and the problem may be represented by the ideal hardware graph of the quantum processor. In operation the at least one processor-based controller may: for a number of iterations i to a number n where n is a positive integer, generate one or more solutions; for each iteration, subsequent to causing a solver to be executed by the quantum processor to generate a plurality of samples as potential solutions, the at least one processor-based controller may: identify at least one portion of the problem graph which is not represented by the working graph; cause a performing of at least one intermediate-processing operation on the plurality of samples by the at least one non-quantum processor-based device to generate a set of intermediate-processing results, the set of intermediate-processing results providing initial estimates for the at least one portion of the problem graph which is not represented by the working graph; determine whether to further process the results to obtain improved results based at least in part on the set of post-processing results; upon determining to further process the results based at least in part on the set of post-processing results, the $i^{th}$ iteration may further include: providing the set of post processing results as inputs to the quantum processor; and initiating an $(i+1)^{th}$ iteration.

A method of operation in a computational system, where the computational system may include a quantum processor comprising a plurality of qubits and one or more coupling devices arranged to form a working graph for embedding a problem graph, and where the computational system may further include at least one non-quantum processor-based device, may be summarized as including: receiving a problem represented as a problem graph having a number of decision variables, the problem graph is at least one of larger than the working graph or has a connectivity that is higher than a connectivity of the working graph; for each iteration of a number of iterations n where n is a positive integer: partitioning the problem graph into a first and a second sub-problem graph, the first sub-problem graph embeddable onto the working graph of the quantum processor; for the first sub-problem graph: embedding the first sub-problem graph onto the working graph, wherein embedding the first sub-problem graph onto the working graph comprises setting a contribution of weights to a qubit bias at a boundary of the first sub-problem graph; and causing a performing of at least one processing operation by the quantum processor to generate a first plurality of partial samples; for the second sub-problem graph: causing a performing of a least one processing operation by the non-quantum processor-based device to generate a second plurality of partial samples; and causing, by at least one controller, a performing of at least one processing operation on at least the first and the second plurality of partial samples by the non-quantum processor-based device to generate a plurality of complete samples.

In one implementation, setting a contribution of weights to a qubit bias at a boundary of the first sub-problem graph includes setting a contribution of weights to a qubit bias at a boundary of the first sub-problem graph to zero.

In another implementation, setting a contribution of weights to a qubit bias at a boundary of the first sub-problem graph includes setting a contribution of weights to a qubit bias at a boundary of the first sub-problem graph based at least in part on the second plurality of partial samples.

In yet another implementation, setting a contribution of weights to a qubit bias at a boundary of the first sub-problem graph based at least in part on the second plurality of partial samples includes, for a first iteration, setting a contribution of weights to a qubit bias at a boundary of the first sub-problem graph to zero, and, for a second iteration, setting a contribution of weights to a qubit bias at a boundary of the first sub-problem based at least in part on the results of the first iteration and the second plurality of partial samples, the second iteration subsequent to the first iteration.

In yet another implementation, setting a contribution of weights to a qubit bias at a boundary of the first sub-problem graph includes, for at least one sample of the second plurality of samples, determining a respective average of each sample, the average taken over more than one iteration of the number of iterations, and setting a contribution of weights to a qubit bias at a boundary of the first sub-problem graph based at least in part on the respective average of each sample.

Causing a performing of at least one processing operation by the quantum processor to generate a first plurality of partial samples may include causing a performing of a quantum annealing operation.

Causing a performing of a quantum annealing operation may include: determining an annealing offset; preparing the plurality of qubits in a determined final state; causing a performing by the quantum processor of a quantum annealing operation run in reverse from the final state to the annealing offset; and causing a performing by the quantum processor of a quantum annealing operation run forward from the annealing offset to the final state.

Causing a performing of at least one processing operation on at least the first and the second plurality of partial samples by the non-quantum processor-based device may include causing a mixing of the first and the second plurality of partial samples by the non-quantum processor-based device.

Causing a mixing of the first and the second plurality of partial samples by the non-quantum processor-based device may include causing a mixing of partial samples at one or more sample temperatures lying within a predetermined range of sample temperatures.

Some implementations of the above described method may further include: for a sample of the plurality of complete samples, determining by the non-quantum processor-based device a probability based at least in part on a sample temperature, a Hamiltonian energy of the sample, and a mean Hamiltonian energy of a plurality of samples lying within a predetermined range of the sample temperature; and inserting by the non-quantum processor-based device the sample and the probability into a dataset.

Other implementations of the above described method may further include: distributing a subset of high-energy samples to higher temperature levels, and distributing a subset of low-energy samples to lower temperature levels.

Other implementations of the above described method may further include: adjusting the temperature of samples based at least in part on an annealing schedule. Adjusting the temperature of samples may be triggered after a determined number of iterations. Adjusting the temperature of samples based at least in part on an annealing schedule may include lowering the temperature of samples based at least in part on an annealing schedule.

A structure of at least one of the sub-problem graphs may be different than a structure of the working graph.

In some implementations, receiving a problem represented as a problem graph may include receiving a problem represented as a problem graph having a K5,5 bipartite graph structure, and the working graph has a $K_{4,4}$ bipartite graph structure. In other implementations, receiving a problem represented as a problem graph may include receiving a problem represented as a problem graph having a non-bipartite graph structure, and the working graph has a bipartite graph structure. In yet other implementations, receiving a problem represented as a problem graph may include receiving a problem represented as a problem graph, and the working graph is a graph minor of the problem graph.

In some implementations, the method may include causing, by at least one controller, a performing of at least one post-processing operation on the one or more samples by the at least one non-quantum processor-based device to generate a set of post-processing results based on the problem graph. Partitioning the problem graph, embedding the first sub-problem graph and causing a performing of at least one processing operation by the quantum processor to generate a first plurality of samples, causing a performing of a least one processing operation by the non-quantum processor-based device to generate a second plurality of samples, causing, by at least one controller, a performing of at least one processing operation on at least the first and the second plurality of partial samples by the non-quantum processor-based device to generate a plurality of complete samples, and causing, by at least one controller, a performing of at least one post-processing operation on the one or more samples by the at least one non-quantum processor-based device to generate a set of post-processing results based on the problem graph are concurrent operations.

Determining whether to further process the results based at least in part on the set of post-processing results may include at least one of comparing a result to a determined satisfaction condition or comparing the number of iterations performed to a defined limit.

Causing a performing of at least one post-processing operation by at the least one non-quantum processor-based device may include causing the performing of the at least one post-processing operation by at least one of a microprocessor, a digital signal processor (DSP), a graphical processing unit (GPU), a field programmable gate array (FPGA), and an Application Specific Integrated Circuit (ASIC).

Causing a performing of at least one post-processing operation by at least one non-quantum processor-based device may include causing a performing of at least one of: a majority voting post-processing operation, a greedy descent post-processing operation, a variable clamping post-processing operation, a variable branching post-processing operation, a local field voting post-processing operation, a local search to find a local minimum post-processing operation, a Markov Chain Monte Carlo simulation at a fixed temperature post-processing operation, and a Metropolis sampling post-processing operation.

In some implementations, the method may further include sending one or more results from the set of post-processing results to a user by at least one component of the computational system.

In some implementations, partitioning the problem graph, embedding the first sub-problem graph and causing a performing of at least one processing operation by the quantum processor to generate a first plurality of samples or causing a performing of a least one processing operation by the non-quantum processor-based device to generate a second plurality of samples, and causing, by at least one controller, a performing of at least one processing operation on at least the first and the second plurality of partial samples by the non-quantum processor-based device to generate a plurality of complete samples are sequential operations.

In other implementations, partitioning the problem graph, embedding the first sub-problem graph and causing a performing of at least one processing operation by the quantum processor to generate a first plurality of samples, causing a performing of a least one processing operation by the non-quantum processor-based device to generate a second plurality of samples, and causing, by at least one controller, a performing of at least one processing operation on at least the first and the second plurality of partial samples by the non-quantum processor-based device to generate a plurality of complete samples are concurrent operations.

A computational system may be summarize as including: at least one quantum processor comprising a plurality of qubits and one or more coupling devices arranged to form a working graph for embedding a problem graph; at least one non-quantum post-processing processor-based device; at least one processor-based controller communicatively coupled to the at least one quantum processor and the at least one non-quantum post-processing processor-based device, in operation the at least one processor-based controller: receives a problem represented as a problem graph having a number of decision variables, the problem graph is at least one of larger than the working graph or has a connectivity that is higher than a connectivity of the working graph; generates one or more solutions by: for each iteration of a number of iterations n where n is a positive integer: partitions the problem graph into a first and a second sub-problem graph, the first sub-problem graph embeddable onto the working graph of the quantum processor; for the first sub-problem graph: embeds the first sub-problem graph onto the working graph, wherein to embed the first sub-problem graph onto the working graph sets a contribution of weights to a qubit bias at a boundary of the first sub-problem graph; and causes at least one processing operation to be performed by the quantum processor to generate a first plurality of partial samples; for the second sub-problem graph: causes a least one processing operation to be performed by the non-quantum processor-based device to generate a second plurality of partial samples; and causes at least one processing operation to be performed on at least the first and the second plurality of partial samples by the non-quantum processor-based device to generate a plurality of complete samples.

The working graph may be a graph minor of the problem graph.

The quantum processor may include a plurality of cells arranged in a grid of M rows of cells and N columns of cells, each of the cells comprising a respective subset of the plurality of qubits, the plurality of cells forming the working graph.

The quantum processor may include a superconducting quantum processor. The plurality of qubits in the superconducting quantum processor may include a plurality of superconducting flux qubits.

Some aspects of the present disclosure provide a method of operation in a computational system. The computational system comprises a quantum processor having a plurality of qubits and one or more coupling devices arranged to form a working graph for embedding a problem graph. The computational system further comprises at least one non-quantum processor-based device. The method comprises: receiving a plurality of problems, each problem representable as a problem graph having a number of decision variables; selecting, from the plurality of problems, a first problem based on one of more properties of the first problem; selecting, from the plurality of problems, a second problem based on at least one of the one or more properties of the first problem and one or more properties of the second problem; determining, for each of the first and second problems, a placement of the problem graph representing the problem in a placement graph; determining an executable representation of the placement graph together with the placements of the first and second problems, the representation executable by the quantum processor in one or more executions; providing the executable representation to the quantum processor for execution; receiving, from the quantum processor, an output based on at least one execution of the executable representation by the quantum processor; and generating a first solution to the first problem and a second solution to the second problem by disaggregating representations of the first and the second solutions from the output.

In some implementations, further comprises determining, for each of the plurality of problems, the problem graph for the problem, the problem graph comprising a sub-graph representing the problem in the placement graph. For each of the first and second problems, determining a placement of the problem graph comprises determining a placement of the sub-graph in the placement graph.

In some implementations, selecting the second problem comprises generating a plurality of clusters of problems based on the one or more properties for each of the plurality of problems, selecting a cluster based on the one or more properties of the cluster's constituent problems, and selecting one or more of the cluster's constituent problems based on the one or more properties of at least one of the cluster's constituent problems.

In some implementations, for at least one of the first and the second problems, the one or more properties of the problem are selected from the group consisting of: a size of the problem, a temperature at which the problem is to be executed, a number of samples to be obtained from the problem, an annealing schedule of the problem, a position of the problem in a queue, and a priority of the problem.

In some implementations, selecting the second problem comprises selecting a smallest problem from at least a subset of the plurality of problems.

In some implementations, the method further comprises iteratively selecting one or more further problems from at least a subset of the plurality of problems and determining a placement for each of the one or more further problems in the placement graph until at least one of: no more of the one or more further problems are placeable in the placement graph without removing an already-placed problem from the placement graph or placements have been determined for each problem in the at least a subset of problems.

In some implementations, determining the placement of at least one of the one or more further problems comprises moving the placement of a previously-placed problem from a first region to a second region in the placement graph, wherein the placement of the at least one of the one or more further problems comprises at least part of the first region.

In some implementations, generating the first and the second solutions comprises: dividing the output into a plurality of subgraphs, each subgraph corresponding to at least one of the plurality of problems and based on the placement of the corresponding problem's problem graph in the placement graph; and associating, for each problem graph, one or more output values of one or more of the plurality of qubits in the problem graph's corresponding subgraph with one or more vertices in the problem graph.

In some implementations, the second problem is a variation of the first problem. In some implementations, the variation comprises a spin reversal transformation. In some implementations, the method further comprises receiving a plurality of data values and a machine learning model. The first problem comprises a first instantiation of the machine learning model with a first one of the plurality of data values and the second problem comprises a second instantiation of the machine learning model with a second one of the plurality of data values.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
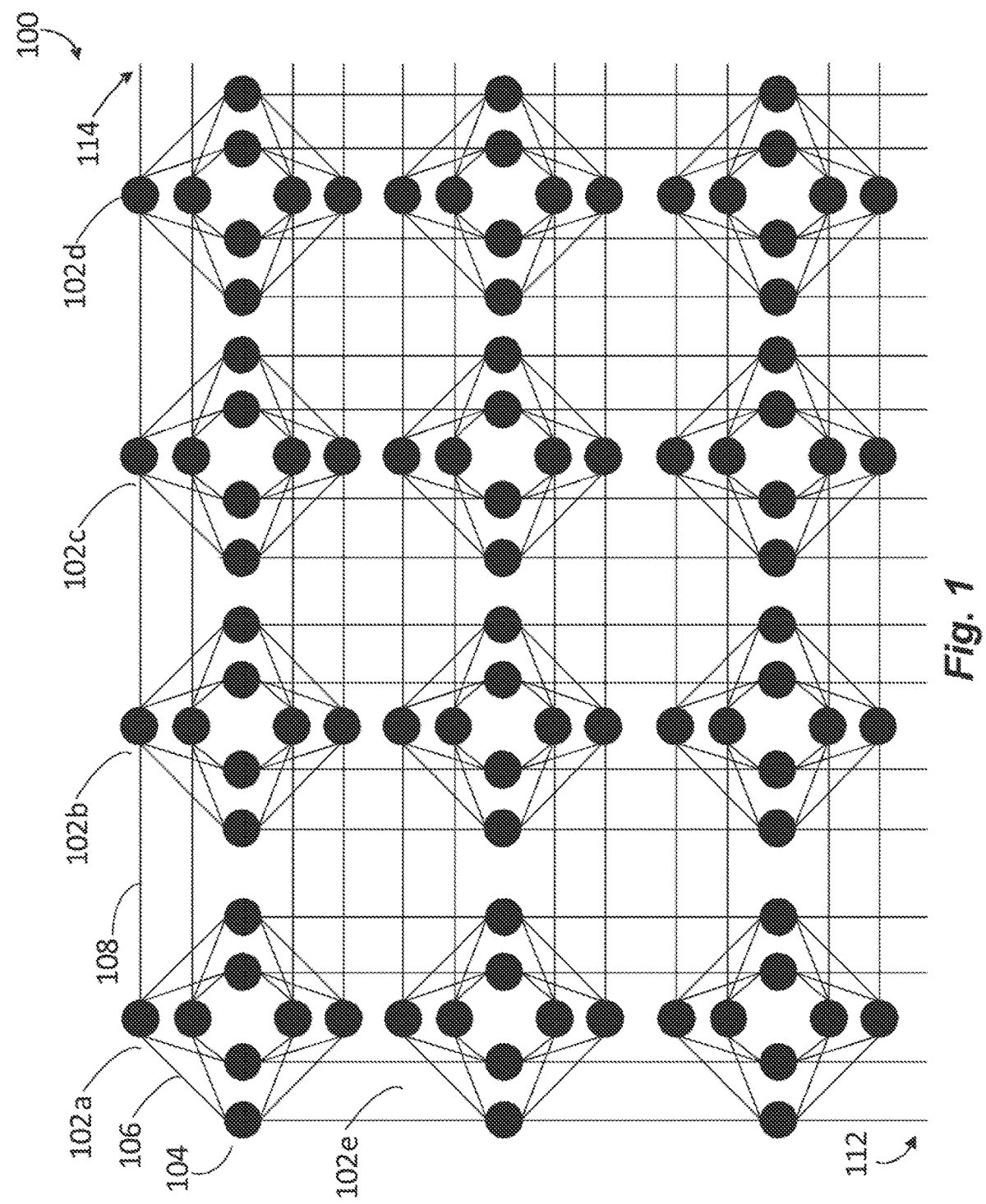
FIG. 1 is a processor hardware graph illustrating the interconnections realized between the qubits in an example quantum processor architecture, in accordance with the presently described systems, devices, articles, and methods.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Graphical Descriptions for Analog Processors

In at least some approaches to dealing with the constraints of at least some analog processors, the representation of the problem graph is selected so that it fits within the processor's working graph. That is, a problem graph $G_P$, where vertices are variables and edges are interactions between variables, may be embedded in a logical graph $G_L$ where each vertex represents a logical computation device and each edge represents a tunable coupler coupling logical computation devices. Logical graph $G_L$ may be represented as an embedded topology defined within a working graph $G_W$, which is the set of working computation devices and couplers on a hardware graph (or "design graph"), $G_H$, of the analog processor. In at least some such approaches, this may be expressed as:

$$G_P \leq_E G_L \leq_{ET} G_W \leq_C G_H \quad (1)$$

where E is an embedding method, ET is an embedded topology method, and C is a calibration method. For at least some problems, representing $G_P$ in a computable form on $G_W$ involves some overhead (which may comprise, e.g., the use of additional computation devices and/or couplers). In some circumstances, appropriate methods E, ET, and/or C may be selected to reduce this overhead, thereby expanding the scope of problems that may be solved on a given working graph $G_W$. However, in such approaches, the scope of problem graphs $G_P$ which may be solved on a given analog processor is still constrained by the size, connectivity, and/or topology of the working graph $G_W$ of the processor. The relationship between problem graph, working graph, and hardware graph is further described in, for example, U.S. provisional patent application Ser. No. 61/983,370 filed 2014 Apr. 3. Further discussion of embedding and embedded topologies is provided in, for example, U.S. provisional patent application Ser. No. 62/114,406.

Figure 2:
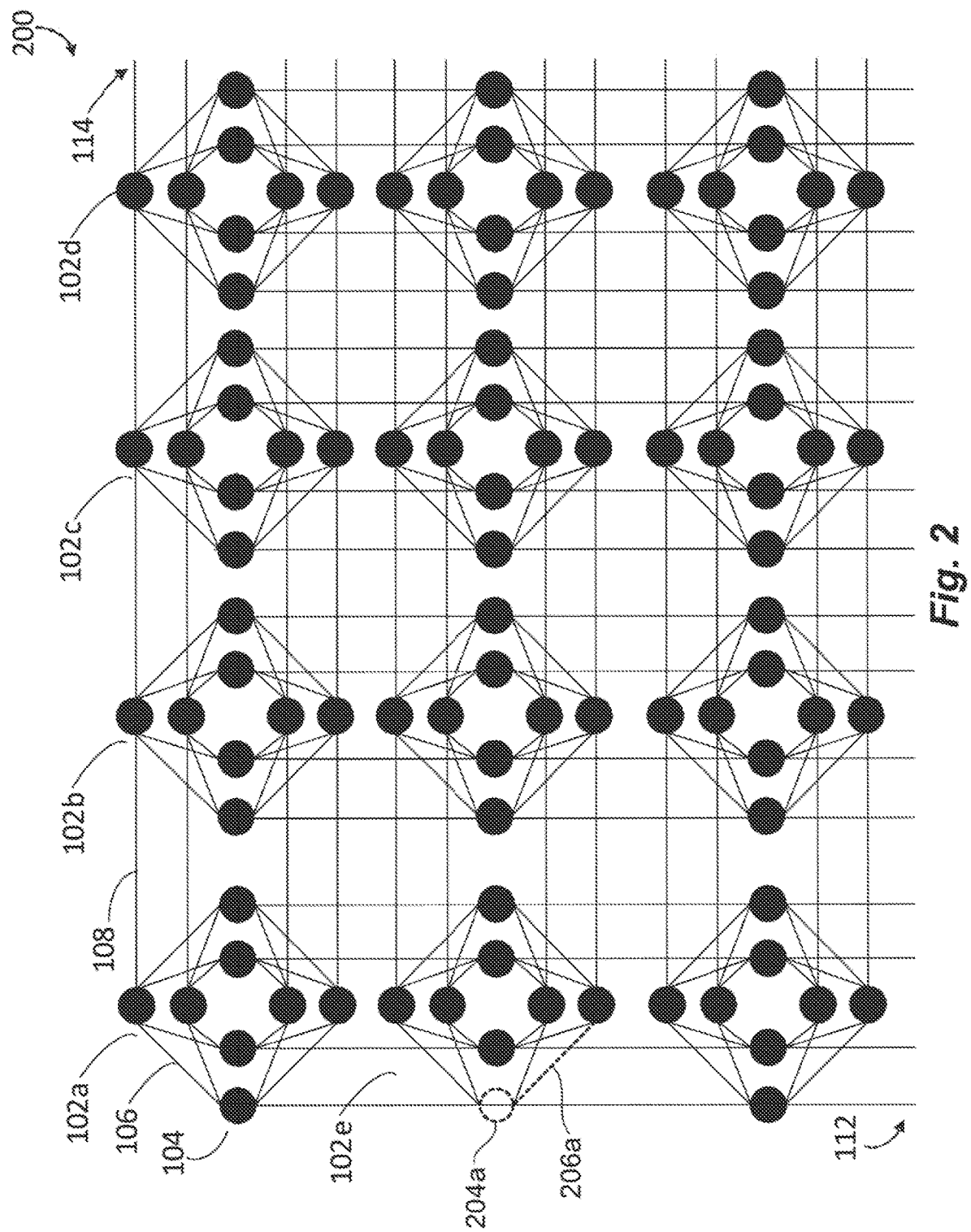
FIG. 2 is a processor working graph corresponding to the hardware graph of FIG. 1 and including inoperative computation devices and couplers.
Figure 3:
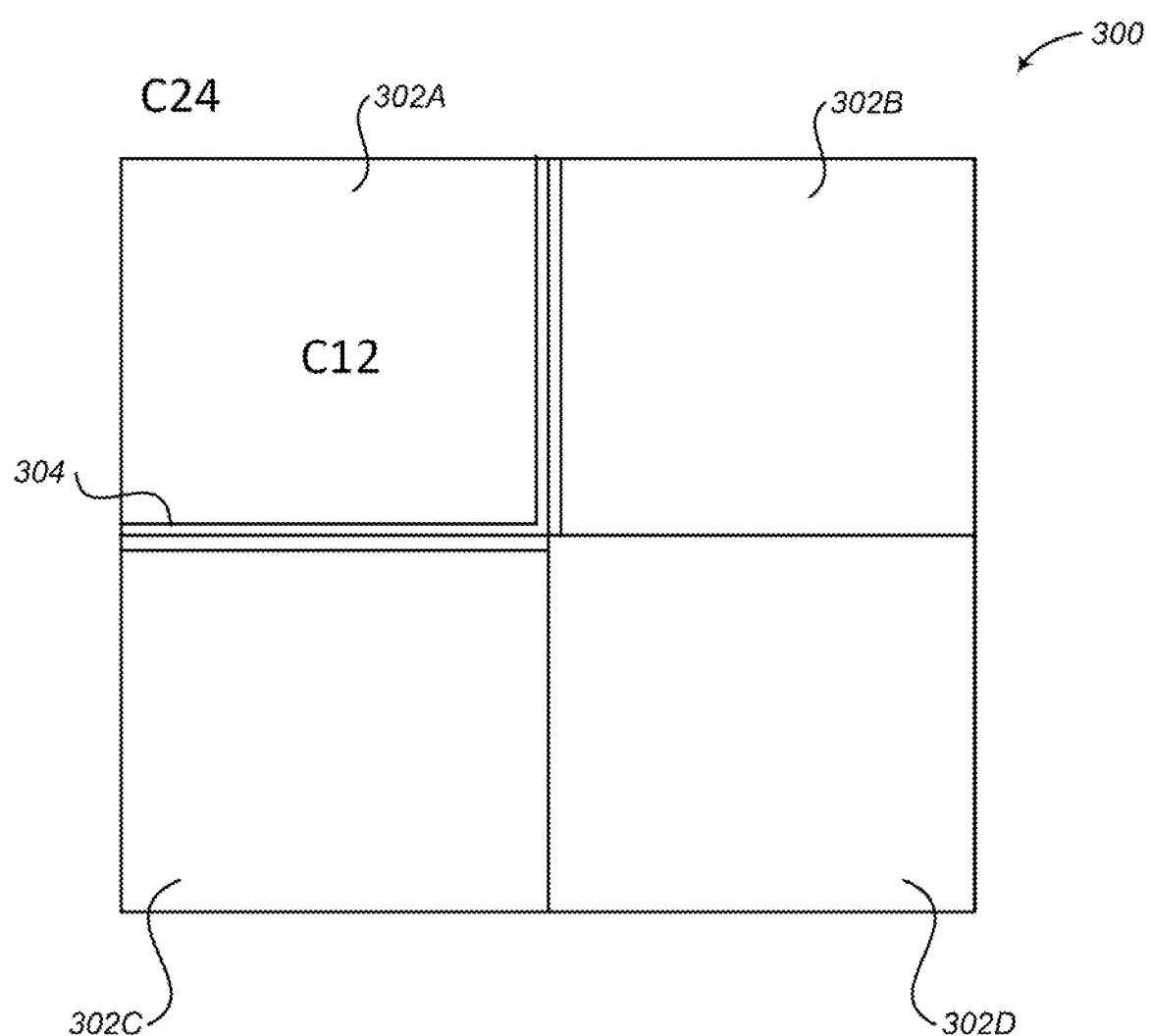
FIG. 3 is a schematic diagram of a $C_{24}$ problem graph with a $C_{12}$ subgraph which may be processed by a $C_{12}$ quantum processor, in accordance with the presently described systems, devices, articles, and methods.

FIGS. 1 and 2 show examples of systems and devices which may implement the present disclosure, including a partial hardware graph of a quantum processor (FIG. 1), and a corresponding partial working graph of a quantum processor (FIG. 2). FIG. 3 shows an example of problem graphs embedded on a working/hardware graphs.

FIG. 1 shows a hardware graph 100 illustrating the interconnections realized between the qubits in an example quantum processor architecture. Graph 100 includes vertices (e.g., 104, only one called out to prevent clutter) and edges (e.g., 106, 108, only two called out to prevent clutter). As shown herein, each vertex is represented as a black dot and each vertex also corresponds to a qubit. Each diamond shaped sub-graph, for example 102a, is a unit cell (or sub-topology). Unit cells may comprise any suitable design, including a bi-partite graph of type and size $K_{4,4}$ (i.e., a 4-by-4 unit cell). U.S. Pat. No. 8,421,053 and U.S. provisional patent application Ser. No. 62/114,406 describe example quantum processors with qubits laid out into an architecture of unit cells including bipartite graphs, such as $K_{4,4}$, in greater detail.

Only five unit cells 102a, 102b, 102c, 102d, and 102e are called out in FIG. 1 to reduce clutter. Each unit cell, such as 102a, 102b, 102c, 102d, and 102e, may represent a unit cell such as the unit cells from U.S. Pat. No. 8,421,053 and/or the like. The lines in FIG. 1 are potential couplings representing intra-cell couplers and inter-cell couplers that may be established between qubits in the same unit cell or adjacent unit cells, respectively. Intra-cell couplings (e.g., 106) are represented with diagonal lines with respect to an orientation of the view of the drawing sheet. Inter-cell couplings (e.g., 108) may be established between horizontally adjacent unit cells, and/or vertically adjacent unit cells and are represented with horizontal and vertical lines with respect to an orientation of the view of the drawing sheet. As illustrated, unit cell 102a is positioned immediately next to unit cell 102b in a horizontal direction with no other unit cells in between, thereby making unit cells 102a and 102b horizontally adjacent and nearest neighbors. Unit cell 102a positioned immediately next to unit cell 102e in a vertical direction with no other unit cells in between, thereby making unit cells 102b and 102c vertically adjacent and nearest neighbors. As shown in hardware graph 100, a unit cell may interact with four other unit cells placed horizontally adjacent, or vertically adjacent by inter-cell coupling, except for those unit cells located at the peripheries of hardware graph 100, which may have fewer adjacent unit cells. The inter-cell couplings marked by couplings 112 and couplings 114 represent further couplings to unit cells not included in FIG. 1.

Those of skill in the art will appreciate that this assignment of vertical and horizontal directions is arbitrary, used as a convenient notation, and not intended to limit the scope of the present systems and devices in any way. It will also be appreciated that the arrangement of inter-cell couplings as horizontal and vertical lines and the intra-cell couplings as diagonal lines is a convention.

FIG. 2 shows an example working graph 200 corresponding to the hardware graph 100 of FIG. 1. An example processor designed based on hardware graph 100 may comprise one or more qubits and/or couplers which are inoperative due to, for example, fabrication defects. Such qubits and/or couplers may be partially operable, in some implementations, but are rendered inoperative during a calibration process to avoid undesirable behavior during operation of the processor. For example, as depicted in FIG. 2, vertex 204a and edge 206a each correspond to an inoperative qubit and coupler, respectively. All other elements of working graph 200 correspond to the like-depicted elements of hardware graph 100. This reduced availability of qubits and/or couplers constrains the scope of problems which may be computed by the processor (relative to the scope of problems which could be computed by a processor implementing the full hardware graph 100 without any inoperative elements).

An example hardware graph $G_H$ for a quantum processor may be based on a $C_{12}$ Chimera graph containing 1152 vertices (qubits) and 3360 edges (couplers). A Chimera graph of size Cs is an s×s grid of chimera cells, each containing a complete bipartite graph on 8 vertices (a $K_{4,4}$). Each vertex is connected to its four neighbors inside the cell as well as (for at least non-boundary vertices) two neighbors (north/south or east/west) outside the cell, for example. Thus, every vertex, excluding boundary vertices, has degree 6. Because the chip fabrication process leaves some small number (typically fewer than 5%) of qubits and couplers unusable, each processor has a specific working graph $G_W \subset C_{12}$. For instance, the working graph of an example $C_{12}$-based processor with Chimera cells may have 1097 working qubits and 3045 working couplers out of the 1152 qubits and 3360 couplers defined by the $C_{12}$ Chimera graph. Thus, some problems which are representable on a full $C_{12}$ graph may not be representable on a particular processor with an imperfect working graph, and the set of such problems is likely to vary between processors (since each processor is likely to have different sets of unusable qubits and/or couplers).

The systems and methods described herein for analog processing of problem graphs are not limited to Chimera graphs for the quantum processor, and may be implemented using suitable hardware graphs. Example hardware topologies are discussed in greater detail in, for example, U.S. Pat. Nos. 8,195,596, 8,063,657, 8,421,053, 8,772,759, 9,170,278, 9,178,154, and 9,183,508.

In some instances, a problem may be represented by a problem graph which is larger than and/or has higher connectivity than the working and/or hardware graph of the processor. In some instances, even if the problem graph is not larger or more/differently connected than the quantum processor, the problem graph may be further represented by an embedding and/or embedded topologies which are larger and/or more highly connected than the working and/or hardware graph. Systems, methods, and articles for working such cases are discussed herein below with reference to FIGS. 3 through 15.

Processing Highly-Connected Problem Graphs

For the purposes of the present specification and the appended claims, a problem graph (and/or its representation) may be considered to be more highly connected than a processor's working and/or hardware graph if the computation of the problem graph (and/or its representation) requires the use of a coupler which the working/hardware graph does not provide. Such problem graphs (and/or their representations) do not necessarily have more edges than the processor has couplers, and their vertices are not necessarily higher-degree (i.e., the vertices do not necessarily have more edges than the processor's qubits have couplers). That is, "more highly connected than the processor" (or a graph of the processor) means "differently connected than the processor in a way which does not permit every connection to be encoded on the processor". Since such mismatches between problem graphs and processors can generally be resolved by increasing the connectivity of the processor, it is convenient to include these problems within the definition of "more highly connected".

The inventors have observed, through experiment, that quantum processors tend to be good at quickly obtaining reasonably approximate solutions even when the complete problem cannot be mapped to the processor's working graph, whereas classical heuristic methods tend to struggle with such large-scale estimations. Conversely, classical heuristic methods tend to be good at computing "last-mile" optimizations (i.e., finding an improved solution based on a reasonable initial state), whereas quantum processors may have difficulty doing this when the problem graph is larger and/or has higher/different connectivity than the working graph of the quantum processor. Generally, the techniques discussed below are hybrid approaches which solve large parts of a problem using a quantum processor and refine the results classically (e.g., using a fat-tree algorithm and/or other classical heuristics).

FIG. 3 is a schematic diagram of a sub-problem graph 300 represented (via an embedding) on a $C_{24}$ hardware graph. Problem graph 300 is divided into subgraphs 302A-D, each of which may be processed by a $C_{12}$ quantum processor. Such processing may be an iterative approach wherein the quantum processor processes multiple portions of the problem graph 300 separately and a classically-implemented postprocessing technique (e.g., a low-treewidth large neighborhood local search, aka "LTLNLS", implementations of which are sometimes referred to as a "fat tree algorithm") is used to improve the result, in particular to improve the results at the boundaries of the processor's working/hardware graph. In some implementations, the weights at the boundaries of the processor's working/hardware graph, indicated by dashed lines 304, may be set based on what is known of adjacent portions of the problem graph 300. The boundary areas 304 of the processor's working/hardware graph indicate areas of particular importance for refinement by the post-processing algorithm. In some implementations, the structure or logical topology of the problem subgraphs 302A-D and the processor's working/hardware graph are different.

The technique described above may require multiple iterations. Generally, the quantum processor generates various patchwork results, followed by a classical heuristic to improve the overall graph, followed by further executions of the quantum processor based on the improved results, followed by the classical heuristic, etc. In some implementations, the classical technique may be performed first to provide an initial state. That is, the algorithm may begin with either quantum or classical processing, and may end with either quantum or classical processing.

In some implementations, a problem may be computable with one iteration of the quantum processor rather than several iterations (each iteration may comprise one or more computations, e.g., depending on the results desired by the user).

Processing Larger Problem Graphs

Figure 4:
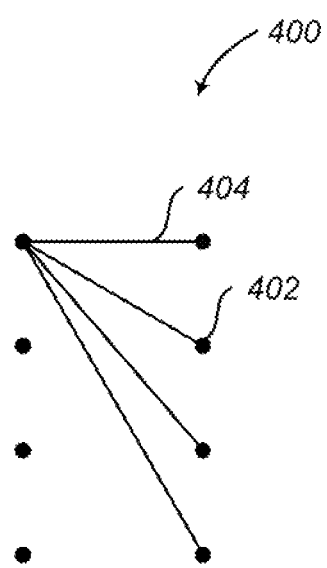
FIG. 4 is a qubit graph illustrating a native $K_{4,4}$ bipartite graph for a quantum processor, in accordance with the presently described systems, devices, articles, and methods.
Figure 5:
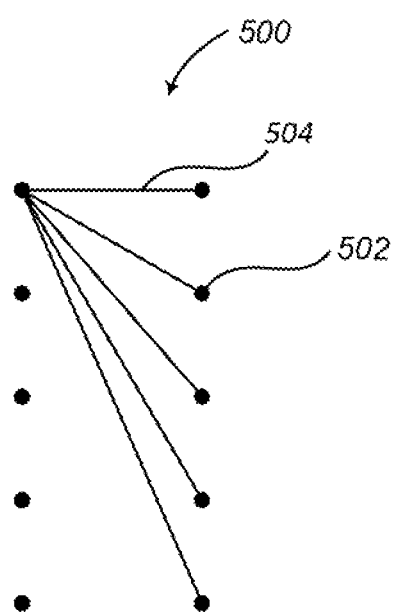
FIG. 5 is a qubit graph illustrating a $K_{5,5}$ bipartite graph for a quantum processor, in accordance with the presently described systems, devices, articles, and methods.
Figure 6:
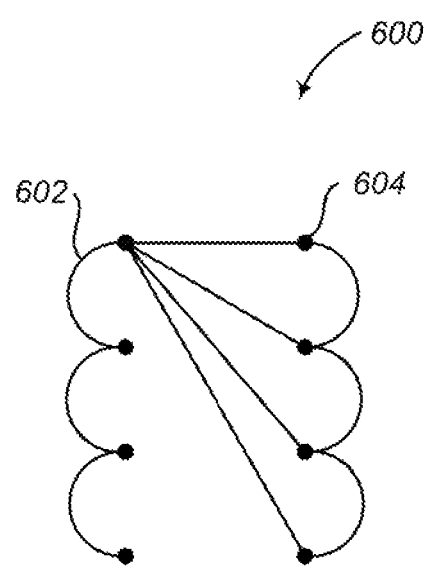
FIG. 6 is a qubit graph illustrating a modified $K_{4,4}$ non-bipartite graph for a quantum processor, in accordance with the presently described systems, devices, articles, and methods.

FIGS. 4, 5 and 6 illustrate qubit graphs 400, 500 and 600, respectively, which allow for solving problems with problem graphs (and/or logical graphs) which are larger than the quantum processor's working/hardware graph. This technique involves using the processor's working and/or hardware graph as the basis for the problem graph, but allows the problem graph's representation to have added vertices and/or edges. The processor's working and/or hardware graph is thus a graph minor of the problem graph. If the number of vertices and edges added are small, this allows the quantum processor to generate a relatively good solution relatively quickly—in some circumstances, in one computation. A classical postprocessing technique (e.g., fat tree algorithm, other classical heuristic) can quickly improve the solution generated by the quantum processor. As used in this paragraph, the term "small" is based on the yield of the processor, the performance of the problem on the processor, and the performance of the classical heuristic, for example.

For example, FIG. 4 is a qubit graph 400 illustrating a native $K_{4,4}$ bipartite graph of the Chimera topology. The qubit graph 400 comprises qubits 402 and horizontal couplings 404. As shown in FIG. 5, rather than the $K_{4,4}$ bipartite graph of the Chimera topology, a user may embed a problem on a $K_{5,5}$ bipartite graph 500 which includes qubits 502 and couplings 504.

The processor may execute using its native $K_{4,4}$ graph, and a classical postprocessing technique may fairly quickly fill in the 20% of the qubits missing from the working/hardware graph. As another example, as shown in FIG. 6, the problem graph could be represented on a modified $K_{4,4}$ graph 600 where additional couplings 602 are added between qubits 604 which are disconnected in the hardware and working graphs of the processor. Such additional couplings 602 (sometimes referred to as "vertical" couplings by the inventors) render the graph 600 non-bipartite, and thus may allow for the computation of more problems than are natively computable on the processor's $K_{4,4}$ working and/or hardware graphs.

Thus, using the techniques described herein, a user may interact with a problem graph with substantially-improved connectivity and/or an increased number of qubits relative to the actual working and/or hardware graph of a processor due to the quantum processor's ability to quickly get to a reasonably accurate approximation and the classical post-processing technique's ability to quickly perform "last-mile" optimization.

In some circumstances, the classical and quantum portions of these computations may be performed in parallel, for example, when the results of one computation are not used as an initial state for the next computation. Such may potentially allow for the same total number of computations to be performed per unit time as if only quantum computations were performed.

The aforementioned technique discussed with reference to FIGS. 4-26 may be considered to be a special case of the technique previously discussed with reference to FIG. 3. In particular, rather than representing the problem on any arbitrarily large and/or well-connected graph, this approach allows the user to embed the problem on a large and/or better-connected graph which shares the structure of the processor's working/hardware graph as a minor embedding. Such an approach may take advantage of the processor's native structure to improve results. Thus, where the problem graph (and/or its embedded representations) is larger than the working and/or hardware graph by a limited degree, this technique may allow for single-shot computation.

Virtual Expansions of the Hardware Graph

Figure 7:
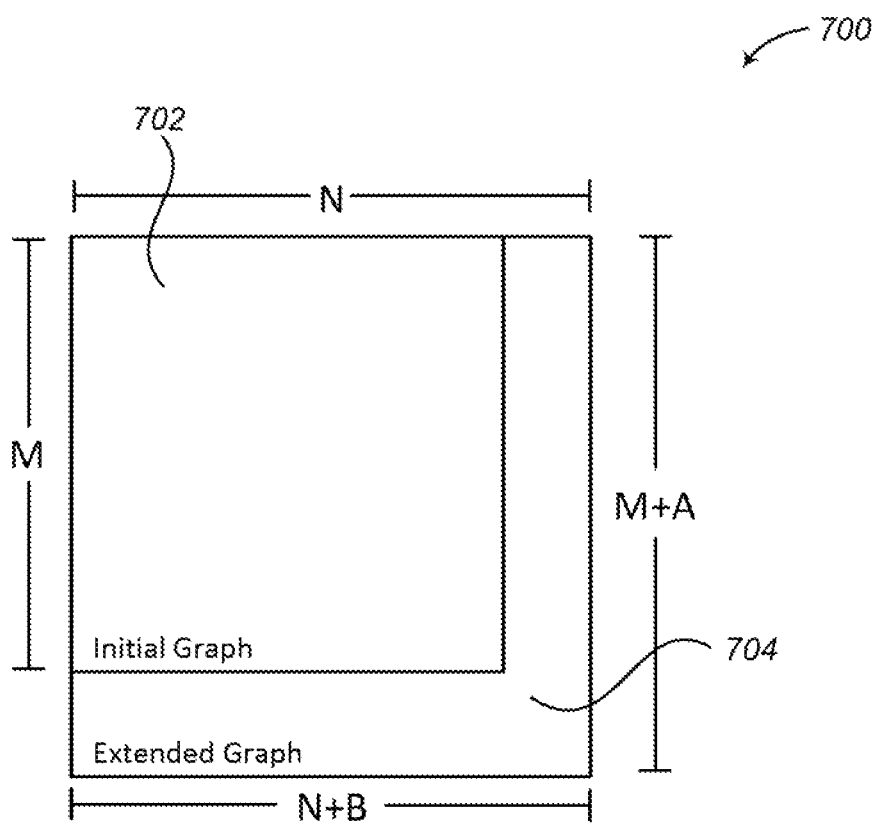
FIG. 7 is a schematic diagram of an initial working/hardware graph and an expanded working/hardware graph of a quantum processor, in accordance with the presently described systems, devices, articles, and methods.

In some implementations, problems may be embedded on expanded versions of a processor's working and/or hardware graph. FIG. 7 is a schematic diagram 700 of an initial working and/or hardware graph 702 and an extended working and/or hardware graph 704 of a quantum processor. By retaining the structure of the working and/or hardware graph 702 as a subgraph of the larger extended graph 704 and (in some implementations) by limiting the degree of the extension, extended graph 704 may be able to solve a larger problem graph without substantially negatively impacting overall performance. In some embodiments, this technique involves adding an additional number of rows and/or columns of unit cells to the initial processor working/hardware graph 702.

In some implementations, performance may be improved when the extended rows/columns are added around the boundary of the initial working and/or hardware graph 702. As shown in FIG. 7, the initial working and/or hardware graph 702 includes M rows of unit cells and N columns of unit cells, where M and N are positive integers. The extended working and/or hardware graph 704 includes M+A rows of unit cells and N+B columns of unit cells, where A and B are positive integers. In at least some implementations where an LTLNLS (e.g., "fat tree") algorithm is used, this technique may work particularly well when the width of the added rows/columns is no greater than one treewidth. For instance, in an example treewidth-4 scenario, one row and one column of unit cells may be added, where each unit cell uses the Chimera topology discussed elsewhere herein.

Figure 8:
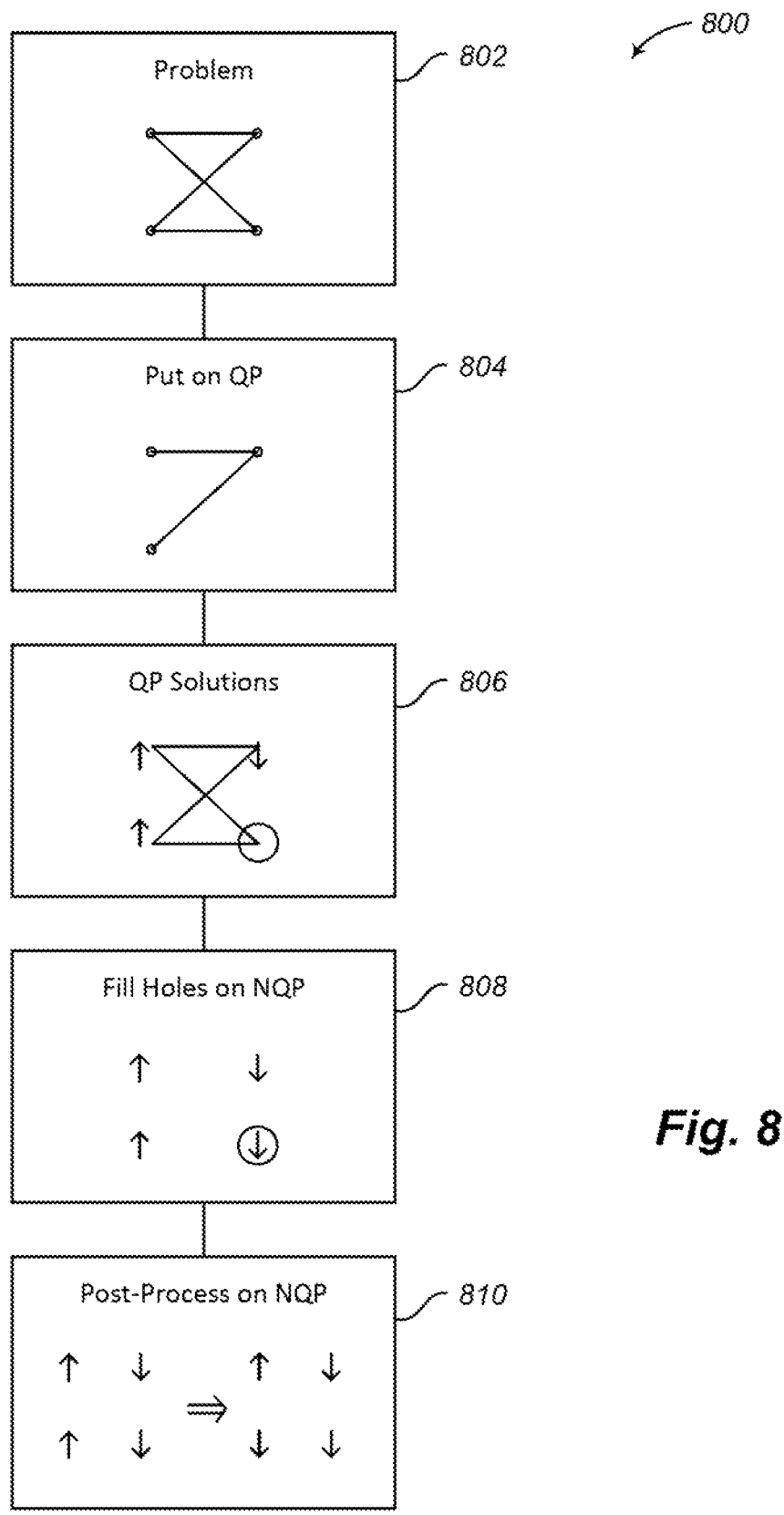
FIG. 8 is a flow diagram showing a method of operation in a computational system which includes modeling a problem on a full-yield hardware graph, performing the problem on a quantum processor, obtaining solutions from the quantum processor, filling holes, and performing a classical heuristic, in accordance with the presently described systems, devices, articles, and methods.

In some implementations, systems and methods described herein may enable the embedding of problems on an ideal hardware graph and may allow for the computation of such problems on an imperfect working graph (which is a graph minor the hardware graph). This may be done rather than (or in addition to) extending the working and/or hardware graph of the processor. FIG. 8 is a flow diagram showing a method 800 of operation in a computational system to embed a problem onto a "virtual full yield" quantum processor. As discussed above, a typical quantum processor's working graph may have a number of missing qubits and couplers due to the fabrication process. In the method 800, a problem graph is represented on an "as designed" or "ideal" hardware graph for a processor with 100% of its qubits and couplers operational. A benefit of this approach is that users may embed problems on an ideal graph even when the quantum processor does not provide such connectivity and, where missing elements are sparse, the results obtained after relatively quick classical post-processing tend to be quite accurate, particularly where inoperative qubits and/or couplers are sparsely distributed in the working graph.

Virtual Full-Yield Hardware Graphs

At 802, a problem may be modeled on the hardware graph (i.e., the "full yield" graph) of a quantum processor. At 804, the problem may be embedded onto the actual working graph of the quantum processor, which is a graph minor of the hardware graph. At 806, initial solutions to the problem are obtained from the quantum processor. Optionally, at 806, at least one processor-based controller of the computational system may execute a "fill holes heuristic" algorithm which specifically targets the missing qubits in the working graph to provide reasonable guesses for the values of the missing qubits based on the output of the quantum processor for surrounding, non-missing qubits. At 810, the results provided by the quantum processor at 804 (optionally, together with the guesses provided at 806) may be used as inputs to a classical post-processing classical operation which provides improved solutions.

Processing Problems by Partitioning

Figure 9:
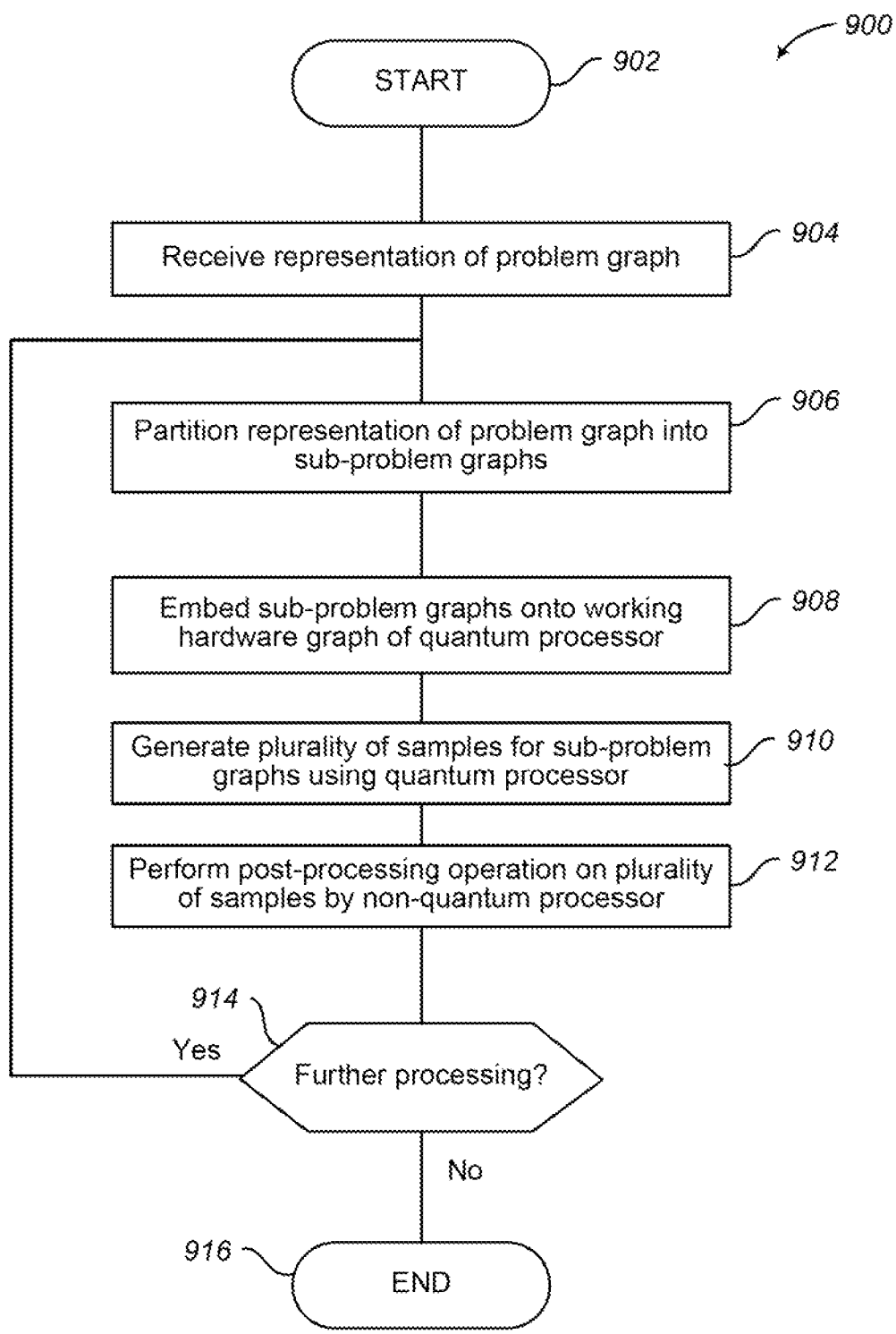
FIG. 9 is a flow diagram showing a method of operation in a computational system which includes partitioning a problem graph into problem sub-graphs, performing the problem sub-graphs on a quantum processor, and performing a classical heuristic, in accordance with the presently described systems, devices, articles, and methods.

FIG. 9 shows a method 900 of operation in a computational system which includes partitioning a problem graph into problem sub-graphs, performing a computation based on the problem sub-graphs on a quantum processor, and performing a classical post-processing technique to improve the results obtained from the quantum processor.

The method 900 starts at 902, for example, in response to submission of a problem or in response to an invocation by another routine. The method 900, or portions thereof, may be executed by one or more processor-based components, for example via one or more processor-based controllers of a job manager, which is communicatively coupled to one or more heuristic optimizers or solvers implemented via appropriate hardware circuitry (e.g., quantum processors, non-quantum processors). Such components and related systems and methods are described in greater detail in, for example, international patent application Serial No. PCT/US2015/046393, filed Aug. 21, 2015.

At 904, at least one processor-based controller receives a representation of a problem graph for a problem which is to be solved. As discussed above, the problem graph may be larger and/or may have higher (or different) connectivity than a working and/or hardware graph of a quantum processor of the computational system. Additionally, the at least one processor-based controller may cause execution of at least one pre-processing operation on the problem, prior to submitting the problem to one or more solvers (e.g., heuristic optimizers). Such may, for example, include checking or confirming that a submitted problem is of a format which is suitable or acceptable for various solvers executable via the system. Additionally, or alternatively such may, for example, include generating one or more representations of the submitted problem.

At 906, the at least one processor-based controller partitions the representation of the problem graph into multiple sub-graphs. At 908, the at least one processor-based controller may embed each of the sub-graphs onto a working graph of a quantum processor. For example, a problem graph represented on a $C_{24}$ graph may be partitioned into four sub-graphs which are each embeddable on a hardware graph of a $C_{12}$ quantum processor. As discussed above, for each of the sub-problem graphs, the at least one processor-based controller may set the weights at the boundary of the working/hardware graph based at least in part on known information regarding sub-problem graphs which are adjacent the sub-problem graph which is being embedded.

As an example, one or more quantum processors may be selected from a variety of different types of quantum processors, for instance one or more superconducting quantum processors designed for AQC and/or quantum annealing.

At 910, the at least one processor-based controller causes the quantum processor to generate one or more samples or solutions for each of the sub-problem graphs. At 912, at least one processor-based controller receives results of or samples from the quantum processor and causes an execution of at least one post-processing operation (e.g., a low-treewidth large neighborhood local search algorithm) on the respective samples via the at least one post-processing non-quantum processor-based device. For example, the post-processing may be executed via one or more non-quantum processors. The non-quantum processors may be selected from at least one of microprocessors, digital signal processors (DSPs), graphical processing units (GPUs), and/or field programmable gate arrays (FPGAs). For instance, a heuristic optimizer may be executed by one or more microprocessors, for instance in parallel by two or more microprocessors. Also for instance, a heuristic optimizer may be executed by one or more DSPs, for instance in parallel by two or more DSPs. Also for instance, a heuristic optimizer may be executed by one or more GPUS, for instance in parallel by two or more GPUs. Also for instance, a heuristic optimizer may be executed by one or more FPGAs, for instance in parallel by two or more FPGAs. Additionally or alternatively, heuristic optimizers may be executed by one or more microprocessors and one or more DSPs, GPUs and/or FPGAs, for instance in parallel by the microprocessors and the DSPs, GPUs and/or FPGAs. Additionally or alternatively, heuristic optimizers may be executed by one or more DSPs and one or more GPUs and/or FPGAs, for instance in parallel by the DSPs and the GPUs and/or FPGAs. Additionally or alternatively, heuristic optimizers may be executed by one or more GPUs, one or more FPGAs, for instance in parallel by the GPUs and FPGAs. Any other combination or permutation of non-quantum processors may be employed which are suitable for the particular problem to be solved and the heuristic optimizer to be employed.

Any suitable post-processing operation(s) may be used. The post-processing operation(s) may, for example include one or more of: low-treewidth large neighborhood local search (e.g., "fat tree") operation, a majority voting post-processing operation, a greedy descent post-processing operation, a variable clamping post-processing operation, a variable branching post-processing operation, or a local field voting post-processing operation, via at least one digital processor executing corresponding instructions or software modules. These and other post-processing operations are discussed in greater detail in, for example, international patent application Serial No. PCT/US2015/046393, filed Aug. 21, 2015.

At 914, at least one processor-based controller determines whether to further process the problem based at least in part on the results of the post-processing. For example, the at least one processor-based controller may determine whether an end condition has been satisfied. In some implementations where method 900 is configured to process the problem in one iteration, 914 is omitted and method 900 proceeds to 916.

If the end condition has been determined to have been satisfied (or if 914 is omitted), control passes to 916 where the method 900 may terminate.

If the end condition has been determined not to have been satisfied, the at least one processor-based controller may cause the quantum processor and or the non-quantum processor-based device to iteratively execute to further improve the results. The at least one processor-based controller may return the modified problem to the same heuristic optimizer(s) used in a previous iteration. Alternatively, the at least one processor-based controller of the computational system may, for example, switch between different ones of the heuristic optimizers between various iterations performed on the problem. For instance, the at least one processor-based controller of the computational system may cause a first one of the heuristic optimizers to optimize the respective problem and a second one of the heuristic optimizers to optimize the modified or intermediate problem, wherein the second one of the heuristic optimizers is different than the first one of the heuristic optimizers.

The operations of the method 900 may be repeated one or more times, iteratively modifying the problem and performing optimization on the modified problem until an end condition is reached or satisfied.

Processing Problems with Different Connectivity than the Hardware Graph

Figure 10:
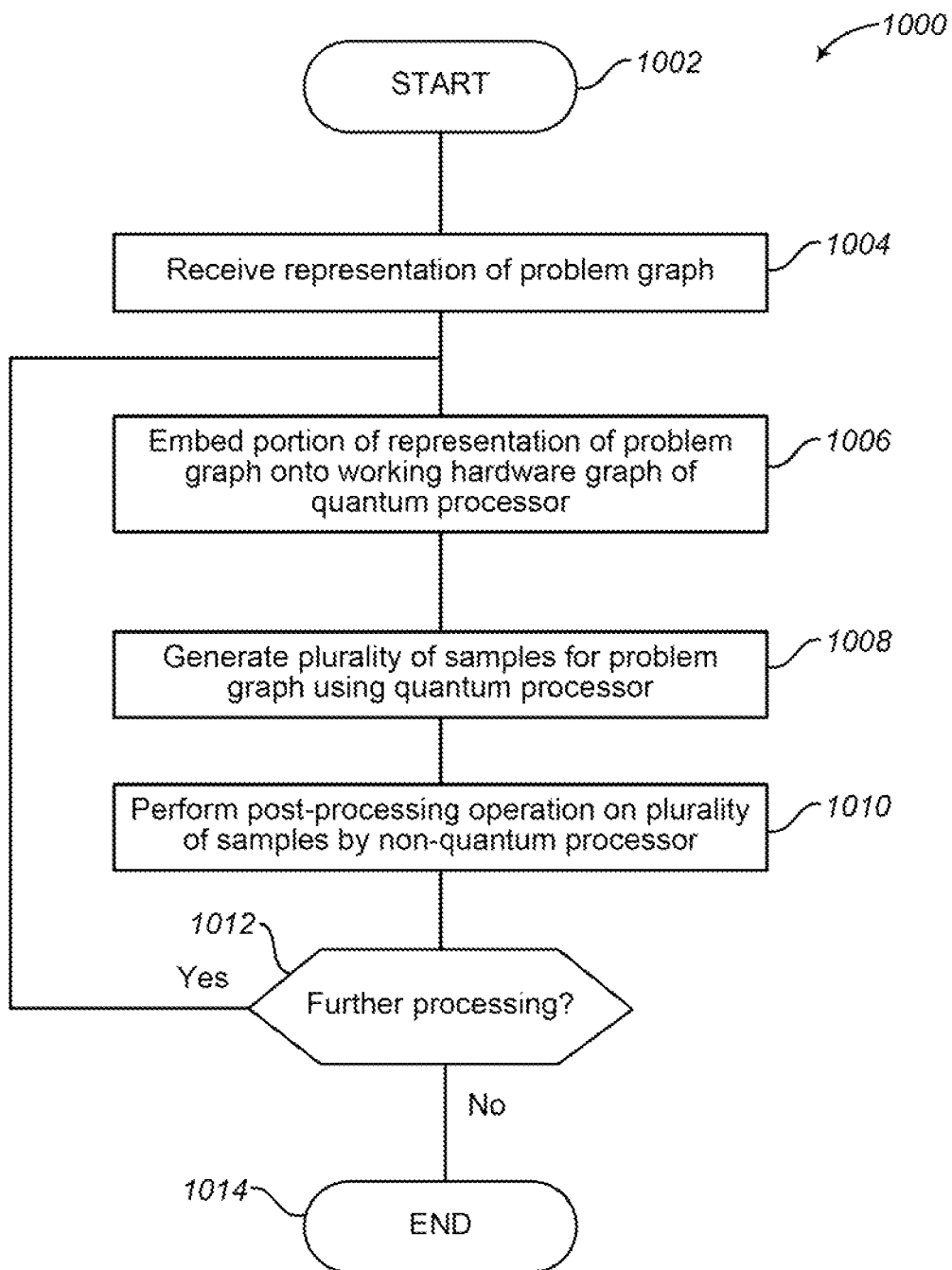
FIG. 10 is a flow diagram showing a low-level method of operation in a computational system which includes receiving a problem graph, performing the problem on a quantum processor, and performing a classical heuristic, in accordance with the presently described systems, devices, articles, and methods.

FIG. 10 shows a method 1000 of operation in a computational system. The method 1000 starts at 1002, for example, in response to submission of a problem or in response to an invocation by another routine. The method 1000, or portions thereof, may be executed by one or more processor-based components, for example via one or more processor-based controllers of a job manager, which is communicatively coupled to one or more heuristic optimizers or solvers implemented via appropriate hardware circuitry (e.g., quantum processors, non-quantum processors). Such components and related systems and methods are described in greater detail in, for example, international patent application Serial No. PCT/US2015/046393, filed Aug. 21, 2015.

At 1004, at least one processor-based controller receives a representation of a problem graph for a problem which is to be solved. As discussed above, the representation of the problem graph may be at least one of: larger than the working graph of a quantum processor, higher connectivity than the working graph, and/or may have different connectivity than the working graph (e.g., where the problem graph comprises an edge between vertices which correspond to qubits that do not share a coupler in the working graph). Additionally, the at least one processor-based controller may cause execution of at least one pre-processing operation on the problem, prior to submitting the problem to one or more solvers (e.g., heuristic optimizers). Such may, for example, include checking or confirming that a submitted problem is of a format which is suitable or acceptable for various solvers executable via the system. Additionally, or alternatively such may, for example, include generating one or more representations of the submitted problem.

At 1006, the at least one processor-based controller may embed a portion of the relatively larger representation of problem graph onto the working graph of a quantum processor. For example, a $K_{5,5}$ problem graph may embedded onto a $K_{4,4}$ bipartite working graph of the quantum processor.

At 1008, the at least one processor-based controller causes the quantum processor to generate one or more solution samples. At 1010, at least one processor-based controller receives results of the samples from the quantum processor and causes an execution of at least one post-processing operation (e.g., a low-treewidth large neighborhood local search algorithm) on the respective samples via the at least one post-processing non-quantum processor-based device.

As discussed above, any suitable post-processing operation(s) may be used. The post-processing operation(s) may, for example include one or more of: low-treewidth large neighborhood local search algorithm operation, a majority voting post-processing operation, a greedy descent post-processing operation, a variable clamping post-processing operation, a variable branching post-processing operation, or a local field voting post-processing operation, via at least one digital processor executing corresponding instructions or software modules.

At 1012, at least one processor-based controller determines whether to further process the problem based at least in part on the results of the post-processing. For example, the at least one processor-based controller may determine whether an end condition has been satisfied. In some implementations where method 1000 is configured to process the problem in one iteration, 1012 is omitted and method 1000 proceeds to 1014.

If the end condition has been determined to have been satisfied (or if 1012 is omitted), control passes to 1014 where the method 1000 may terminate.

If the end condition has been determined not to have been satisfied, the at least one processor-based controller may cause the quantum processor and or the non-quantum processor-based device to iteratively execute to further improve the results. The at least one processor-based controller may return the modified problem to the same heuristic optimizer(s) used in a previous iteration. Alternatively, the at least one processor-based controller of the computational system may, for example, switch between different ones of the heuristic optimizers between various iterations performed on the problem. For instance, the at least one processor-based controller of the computational system may cause a first one of the heuristic optimizers to optimize the respective problem and a second one of the heuristic optimizers to optimize the modified or intermediate problem, wherein the second one of the heuristic optimizers is different than the first one of the heuristic optimizers.

The operations of the method 1000 may be repeated one or more times, iteratively modifying the problem and performing optimization on the modified problem until an end condition is reached or satisfied.

Partitioning Problems

As described above in relation to FIG. 3, a sub problem graph (such as sub-problem graph 300 of FIG. 3) may be generated by partitioning a problem graph into two or more sub-problem graphs, one of which may be embeddable onto the hardware graph of an analog processor such as a quantum processor. In some implementations, the problem graph may be partitioned, and a portion of the problem graph may be embedded onto a hardware graph of the analog processor.

The technology described in the present application comprises systems and methods for blended or hybrid computation suitable, for example, for processing of problem graphs larger than the working graph of an analog processor. In one embodiment, the hybrid approach reflects at least in part the general structure of simulated annealing with parallel tempering, and uses analog processing hardware to suggest assignments for portions of the decision variables.

The hybrid approach described in the present application partitions the graph underlying the problem Hamiltonian into two parts. The first part can be embedded in the hardware of the analog processor. Typically, the first part of the problem Hamiltonian is significantly smaller than the second part.

In general terms, variables V can be partitioned into partitions U and W. The problem Hamiltonian:

$$H(x) = \sum_{v \in V} h_v x_v + \sum_{v \in V} \sum_{u \in V} J_{u,v} x_u x_v$$

can be expressed as a sum of three Hamiltonians, as follows:

$$H(x) = H_U(x_U) + H_W(x_W) + H_{UW}(x)$$

where $$H_U(x_U) = \sum_{v \in U} h_v x_v + \sum_{v \in U} \sum_{u \in U} J_{u,v} x_u x_v$$

$$H_W(x_W) = \sum_{v \in W} h_v x_v + \sum_{v \in W} \sum_{u \in W} J_{u,v} x_u x_v$$

and $$H_{UW}(x) = \sum_{u \in U} \sum_{v \in W} J_{u,v} x_u x_v$$

The partition (U, W) can be chosen such that $$\varepsilon_{UW} = \sum_{u \in U} \sum_{v \in W} |J_{u,v}|$$

is small. In terms of the underlying graph, it can be desirable that the weighted edge cut (where weights are replaced by their absolute values) induced by the partition (U,W) is small.

Figure 11:
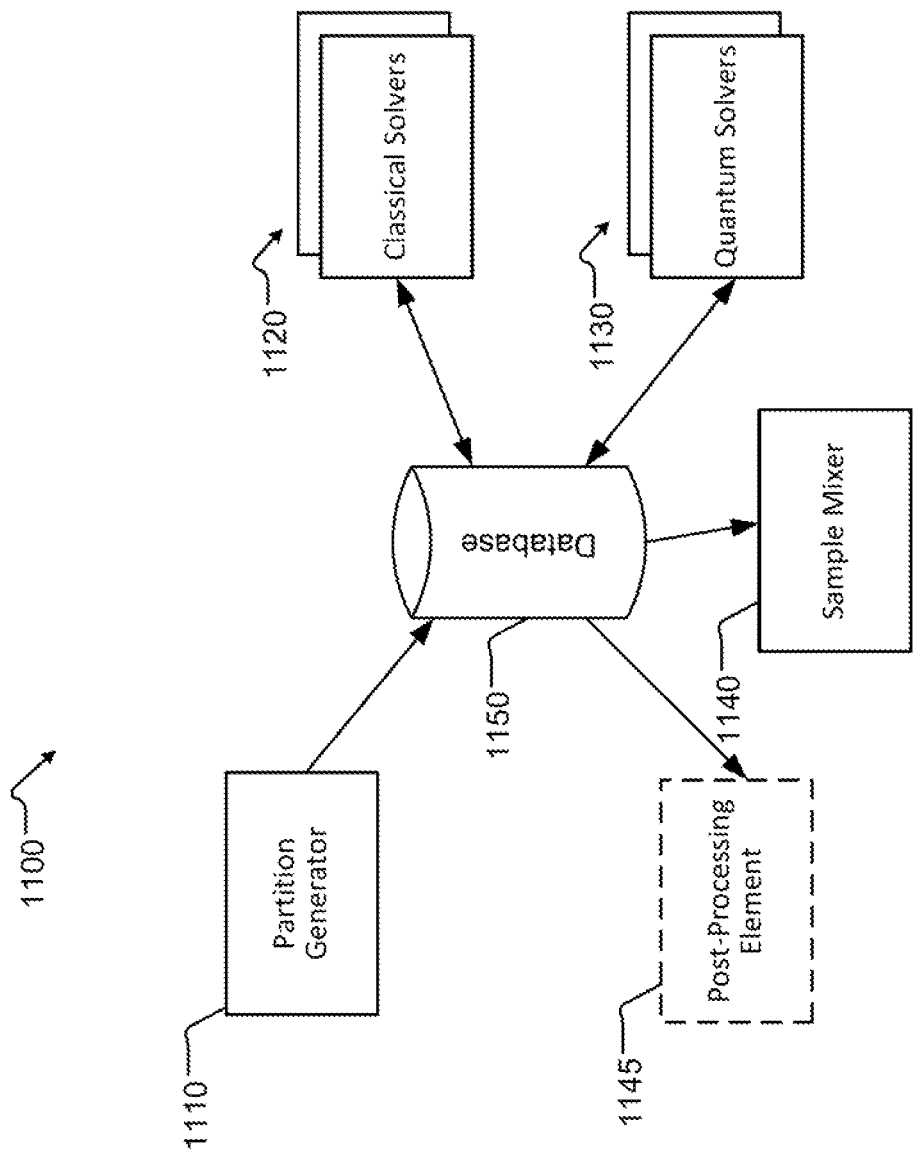
FIG. 11 is a block diagram illustrating elements of an example embodiment of a computational system, in accordance with the presently described systems, devices, articles, and methods.

FIG. 11 is a block diagram illustrating elements of an example embodiment of a computational system 1100, in accordance with the presently described systems, devices, articles, and methods. Computational system 1100 comprises partition generator 1110, one or more classical solvers 1120, one or more quantum solvers 1130, and a sample mixer 1140. Partition generator 1110 can generate a partition of the variables into two or more subsets of variables. One or more classical solvers 1120 and/or one or more quantum solvers 1130 can generate partial samples. Sample mixer can mix partial samples from the one or more classical solvers 1120 and/or one or more quantum solvers 1130 to generate complete samples.

In one implementation, partition generator 1110, one or more classical solvers 1120, one or more quantum solvers 1130, and a sample mixer 1140 are run concurrently with one another. For example, in parallel operation, computational system 1100 can generate a partition, run classical and/or quantum solvers, and mix partial samples to complete samples at the same time. Parallel operation of partition generator 1110, one or more classical solvers 1120, one or more quantum solvers 1130, and sample mixer 1140 can increase efficiency.

In another implementation, partition generator 1110, one or more classical solvers 1120, one or more quantum solvers 1130, and sample mixer 1140 are run sequentially. For example, in sequential operation, computational system 1100 may first generate a partition, and then run the one or more classical and/or quantum solvers in parallel, and finally mix the partial samples to generate complete samples.

In yet another implementation, partition generator 1110, one or more classical solvers 1120, one or more quantum solvers 1130, and a sample mixer 1140 are run using a suitable combination of sequential and parallel operation.

Computational system 1100 further comprises a datastore, for example a database 1150. Partition generator 1110, one or more classical solvers 1120, one or more quantum solvers 1130, and a sample mixer 1140 can communicate through the datastore, e.g., database 1150. The datastore, e.g., database 1150 can store partitions, partial samples associated with partitions, and/or complete samples. A partial sample associated with a partition (U,W) is a set of spins $x_U$ or $x_W$ corresponding to the variables in one component or the other. Partial samples and complete samples are associated with temperatures. Classical solvers accept temperature as a parameter, and quantum solvers can simulate operation at various temperatures by scaling the Hamiltonian by a constant multiple.

Typically, partition generator 1110 can generate more partitions than will be used by the solvers. Computational system 1100 can select a partition from the partitions generator by partition generator 1110. Partitions can be ranked according to the size of W (larger is better) and $\varepsilon_{UW}$ (smaller is better), and dissimilarity from previously chosen partitions. For example, the dissimilarity between ($U_1$, $W_1$) and ($U_2$, $W_2$) could be defined as the average graph distance between variables in $W_1$ and $W_2$.

Computational system 1100 can place a determined bound on the number of partitions to store. When the bound is reached, computational system 1100 can discard (i.e., deleted from the database) a partition and the partial samples associated with it.

In one implementation, computational system 1100 further comprises optional post-processing element 1145. Post-processing element 1145 is operable to perform one or more post-processing operations on the complete samples. Post-processing element 1145 can run concurrently or in sequence with partition generator 1110, classical solvers 1120, quantum solvers 1130, and sample mixer 1140. A method of operation of computational system 1100 comprising one or post-processing operations is described below with reference to FIG. 12B.

Figure 12A:
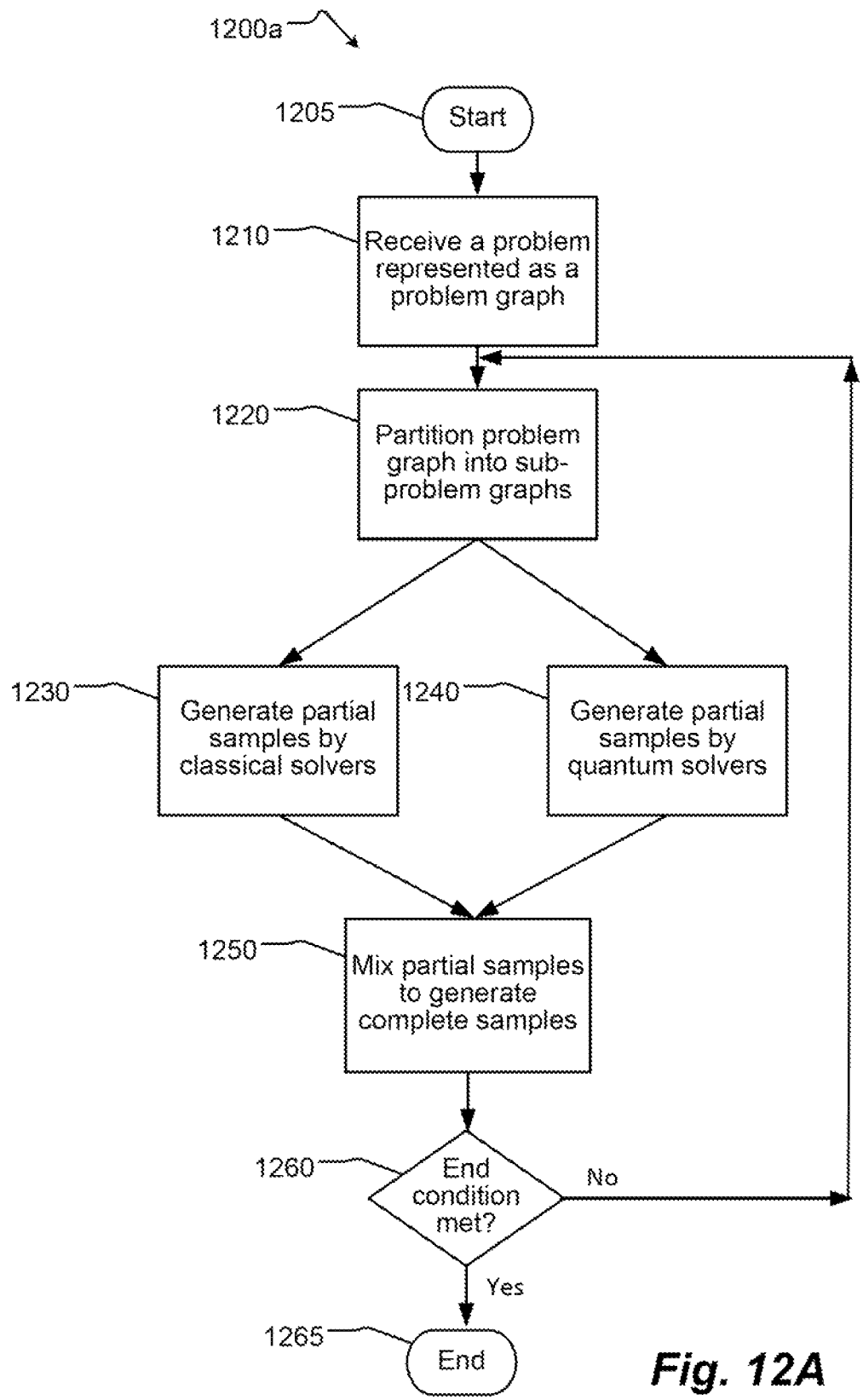
FIG. 12A is a flow diagram illustrating an example method of operation of a computational system such as the computational system of FIG. 11, in accordance with the present systems, devices, articles, and methods, according to at least one implementation.

FIG. 12A is a flow chart illustrating an example method of operation 1200a of a computational system such as computational system 1100 of FIG. 11. In some implementations, the computational system comprises a quantum processor comprising a plurality of qubits and one or more coupling devices arranged to form a working graph for embedding a problem graph. The computational system can further comprise at least one non-quantum processor-based device.

The method 1200a starts at 1205, for example, in response to submission of a problem or in response to an invocation by another routine. The method 1200a, or portions thereof, may be executed by one or more processor-based components, for example via one or more processor-based controllers of a job manager, which is communicatively coupled to one or more quantum processors and/or non-quantum processor-based devices.

At 1210, the computational system receives a problem represented as a problem graph having a number of decision variables. In one example, the problem graph is either larger than the working graph or has a connectivity that is higher than a connectivity of the working graph, or both.

At 1220, the computational system partitions the problem graph into two sub-problem graphs, a first sub-problem graph and a second sub-problem graph. Typically, the first sub-problem graph is embeddable onto the working graph of the one or more quantum processors.

At 1230, one or more classical solvers running on at least one non-quantum processor-based device generate a set of classically-generated partial samples. The classically-generated partial samples can be stored in a datastore such as database 1150 of FIG. 11.

At 12110, the computational system embeds the first sub-problem graph onto the working graph of a quantum processor. Embedding the first sub-problem graph onto the working graph of the quantum processor can include setting a contribution of weights to a qubit bias at a boundary of the first sub-problem graph. The quantum processor can generate a set of quantum-generated partial samples. The quantum-generated partial samples can be stored in a datastore such as database 1150 of FIG. 11.

The computational system can run the classical and quantum solvers in parallel or in sequence, or in a suitable combination of parallel and sequential operation.

At 1250, the computational system can perform a sample mixing operation on the classically-generated and the quantum-generated partial samples to generate complete samples. The sample mixing operation can include reading partial samples from the datastore. The complete samples can be written to a datastore. The datastore can be the same or different than the datastore used to store the partial samples. The sample mixing operation can be initiated and/or controlled by at least one controller in the computational system.

At 1260, if the end condition has been determined to have been satisfied, control passes to 1265 where method 1200a may terminate. If the end condition has been determined not to have been satisfied, control returns to 1220, and method 1200a performs another iteration. Acts 1220, 1230, 1240, 1245, and 1250 of method 1200a may be repeated one or more times, until the end condition is reached or satisfied.

The classical and quantum solvers can operate in several modes. In one mode of operation of the classical and quantum solvers, the Hamiltonian $H_{UW}(x)$ is ignored. Embedding the sub-problem graph onto the graph includes setting a contribution of weights to a qubit bias at the boundary of the sub-problem to zero. Samples are generated for a range of temperatures. This mode is known as an "unbounded" mode.

In another mode of operation, the spins in either U (in the case of a quantum solver) or W (in the case of a classical solver) are fixed with the spins from a partial sample associated with the partition (U,W) or with spins from a complete sample. The solver uses one of the augmented Hamiltonians:

$$H_W + \alpha H_{UW}(x_U)$$

or $$H_U + \alpha H_{UW}(x_W)$$

with $\alpha=1$. This mode is known as a "bounded" mode.

The unbounded mode can be useful at the beginning, and immediately after a partition is chosen. Partial samples found in an unbounded mode for a partition can be used to seed a round of bounded mode for the same partition. In this approach, samples can be selected as seeds with a variety of temperatures, and the solver can be operated at the sample temperature. Optionally, in this approach, complete samples can take the place of partial samples. The sample mixer can be bypassed when the partial samples are generated by a classical or a quantum solver operating in bounded mode and where the result is a complete set of spins.

In another mode of operation, one or more samples are averaged, and the corresponding augmented Hamiltonian can take $0 \leq \alpha \leq 1$. This mode is known as a "soft-bounded" mode. In this mode of operation of the solvers, seeds used to initialize the solvers can have the same temperature as each other, and the solver can operate at that temperature. When there are more than a determined number of partial samples associated with a particular component of a particular partition and a particular temperature, the solvers can stop.

In yet another mode of operation (known as a back or reverse anneal mode), qubits in the quantum processor are prepared in a particular seed state, and the annealing schedule is run backwards for a selected time tp, known as an annealing offset. The annealing schedule is then run forwards from the annealing offset. The annealing offset can be configured during operation of computational system 400 of FIG. 4.

In one implementation, the sample mixer monitors the datastore for the appearance of a new partial solution. When a new partial solution appears, the sample mixer combines the new partial solution with other partial solutions at the same temperature, or similar temperatures. The resulting complete samples are inserted into the datastore with probability $P(E_x, E_T, T)$ where $E_X$ is the Hamiltonian energy of a sample x, $E_T$ is the mean Hamiltonian energy of samples at the sample temperature T, and P is a probability function. For example, the probability function can be:

$$P(E_x, E_T, T) = 1 \text{ if } E_x < E_T, \text{else } P(E_x, E_T, T) = e^{-(E_x - E_T)T}$$

When there are more than a determined number of complete samples at a particular temperature, a portion of the highest-energy samples can be distributed to higher temperature levels T' with probability $P(E_x, E_T, T')$. Samples can be discarded if they fail to be inserted at the highest temperature level. Similarly, a portion of the lowest-energy samples can be distributed to lower temperature levels, starting at the lowest energy level and rising until T'=T, at which point the sample can be discarded.

In another implementation, a global annealing schedule can be used, in which the temperature of samples is adjusted according to an annealing schedule. For example, each stage of the annealing schedule can be triggered after a certain number of partitions have been generated. In some implementations, the temperature of samples is lowered according to an annealing schedule.

In one implementation, the approach comprises embedding the problem on a suitably sized Chimera graph (for example a $C_m$ graph), and using a "window" of the embedding (for example a $C_n$ subgraph of the $C_m$ graph) as a partition.

Figure 12B:
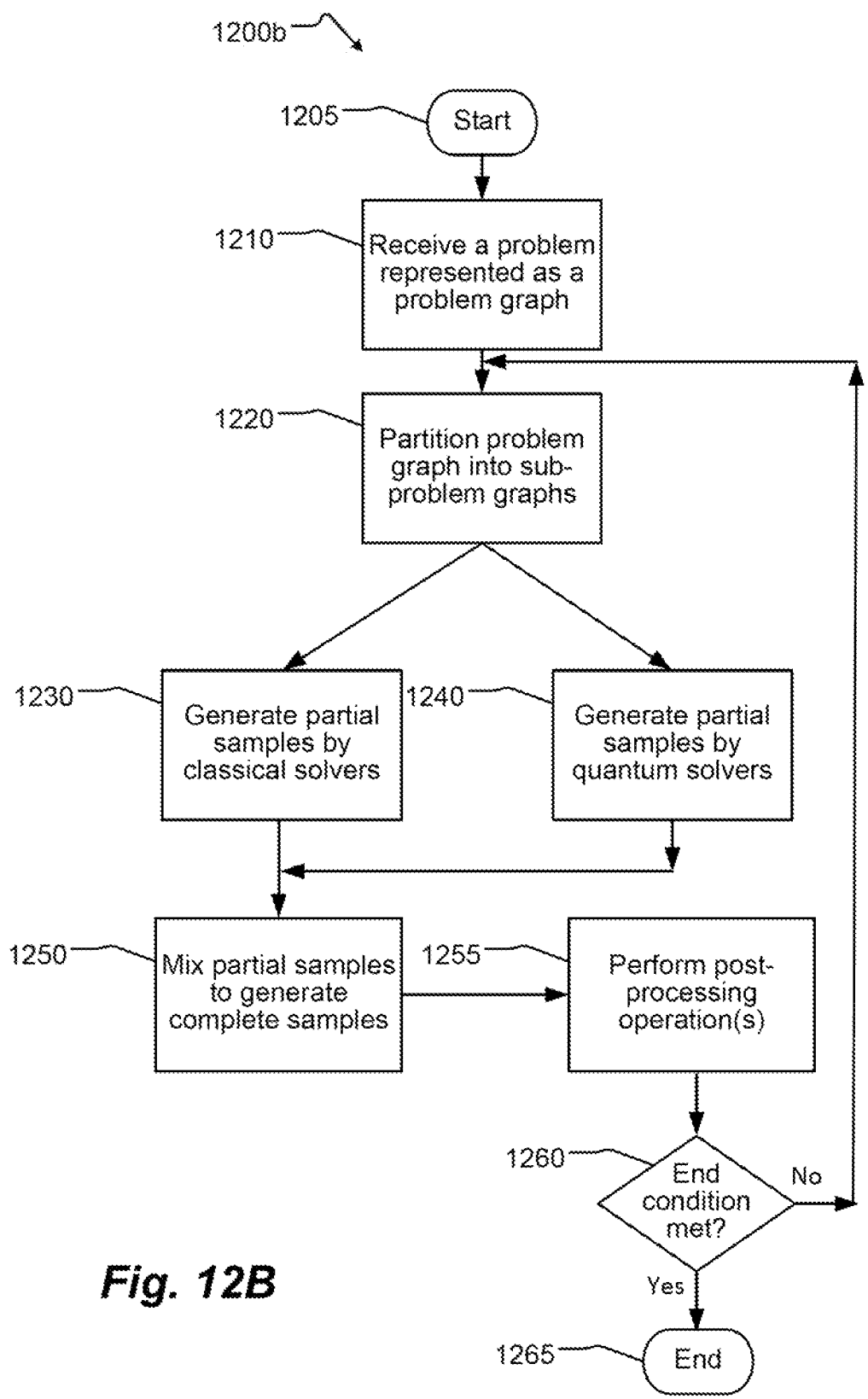
FIG. 12B is a flow diagram illustrating another example method of operation of a computational system such as the computational system of FIG. 11, which includes performing a classical post-processing technique to improve the results obtained from the sample mixing, in accordance with the present systems, devices, articles, and methods, according to at least one implementation.

FIG. 12B is a flow diagram illustrating another example method of operation 1200b of a computational system such as computational system 400 of FIG. 4, which includes performing a classical post-processing technique to improve the results obtained from the sample mixing, in accordance with the present systems, devices, articles, and methods, according to at least one implementation.

Method 1200b starts at 1205, for example, in response to submission of a problem or in response to an invocation by another routine. Method 1200b, or portions thereof, may be executed by one or more processor-based components, for example via one or more processor-based controllers of a job manager, which is communicatively coupled to one or more quantum processors and/or non-quantum processor-based devices.

At 1210, the computational system receives a problem represented as a problem graph having a number of decision variables. In one example, the problem graph is either larger than the working graph or has a connectivity that is higher than a connectivity of the working graph, or both.

At 1220, the computational system partitions the problem graph into two sub-problem graphs, a first sub-problem graph and a second sub-problem graph. Typically, the first sub-problem graph is embeddable onto the working graph of the one or more quantum processors.

At 1230, one or more classical solvers running on at least one non-quantum processor-based device generate a set of classically-generated partial samples. The classically-generated partial samples can be stored in a datastore, for example a database such as database 450 of FIG. 4.

At 1240, the computational system embeds the first sub-problem graph onto the working graph of a quantum processor. Embedding the first sub-problem graph onto the working graph of the quantum processor can include setting a contribution of weights to a qubit bias at a boundary of the first sub-problem graph. The quantum processor can generate a set of quantum-generated partial samples. The quantum-generated partial samples can be stored in a datastore for example a database such as database 450 of FIG. 4.

The computational system can run the classical and quantum solvers in parallel or in sequence, or in a suitable combination of parallel and sequential operation.

At 1250, the computational system can perform a sample mixing operation on the classically-generated and the quantum-generated partial samples to generate complete samples. The sample mixing operation can include reading partial samples from the datastore. The complete samples can be written to a datastore, for example a database. The datastore, e.g., database, can be the same or different than the datastore (e.g., database) used to store the partial samples. The sample mixing operation can be initiated and/or controlled by at least one controller in the computational system.

At 1255, the computation system can perform a classical post-processing operation on the complete samples generated by the sample mixing operation at 1250. At least one processor-based controller causes an execution of at least one post-processing operation (e.g., a low-treewidth large neighborhood local search algorithm) on the respective complete samples via the at least one post-processing non-quantum processor-based device. The complete samples may be read from the datastore (e.g., database).

The post-processing may be executed via one or more non-quantum processors, for example. The non-quantum processors may be selected from at least one of microprocessors, digital signal processors (DSPs), graphical processing units (GPUs), and/or field programmable gate arrays (FPGAs). For instance, a heuristic optimizer may be executed by one or more microprocessors, for instance in parallel by two or more microprocessors. Also for instance, a heuristic optimizer may be executed by one or more DSPs, for instance in parallel by two or more DSPs. Also for instance, a heuristic optimizer may be executed by one or more GPUs, for instance in parallel by two or more GPUs.

Also for instance, a heuristic optimizer may be executed by one or more FPGAs, for instance in parallel by two or more FPGAs. Additionally or alternatively, heuristic optimizers may be executed by one or more microprocessors and one or more DSPs, GPUs and/or FPGAs, for instance in parallel by the microprocessors and the DSPs, GPUs and/or FPGAs. Additionally or alternatively, heuristic optimizers may be executed by one or more DSPs and one or more GPUs and/or FPGAs, for instance in parallel by the DSPs and the GPUs and/or FPGAs. Additionally or alternatively, heuristic optimizers may be executed by one or more GPUs, one or more FPGAs, for instance in parallel by the GPUs and FPGAs. Any other combination or permutation of non-quantum processors may be employed which are suitable for the particular problem to be solved and the heuristic optimizer to be employed.

Any suitable post-processing operation(s) may be used. The post-processing operation(s) may, for example include one or more of: low-treewidth large neighborhood local search (e.g., "fat tree") operation, a majority voting post-processing operation, a greedy descent post-processing operation, a variable clamping post-processing operation, a variable branching post-processing operation, or a local field voting post-processing operation, via at least one digital processor executing corresponding instructions or software modules. These and other post-processing operations are discussed in greater detail in, for example, international patent application Serial No. PCT/US2015/046393, filed Aug. 21, 2015.

At 1260, if the end condition has been determined to have been satisfied, control passes to 1265 where method 1200*b* may terminate. If the end condition has been determined not to have been satisfied, control returns to 1220, and method 1200*b* performs another iteration. Acts 1220, 1230, 1240, 1245, 1250, and 1255 of method 1200*b* may be repeated one or more times, until the end condition is reached or satisfied. At least one processor-based controller determines whether to further process the problem based at least in part on the results of the post-processing. For example, the at least one processor-based controller may determine whether an end condition has been satisfied. In some implementations, method 1200*b* is configured to process the problem in one iteration, and method 1200*b* proceeds to 1265. If the end condition has been determined to have been satisfied, control passes to 1265 where the method 1200*b* may terminate.

If the end condition has been determined not to have been satisfied, the at least one processor-based controller may cause the quantum processor and or the non-quantum processor-based device to iteratively execute to further improve the results. The operations of the method 1200*b* may be repeated one or more times, iteratively, until an end condition is reached or satisfied.

The computational system can run the partitioning, the generation of partial samples by classical and/or quantum solvers, the sample mixing, and the post-processing operation(s) in parallel or in sequence, or in a suitable combination of parallel and sequential operation.

Parallel Quantum Computation

In some implementations, a plurality of problems are represented simultaneously on the hardware graph of an analog processor, thereby allowing for parallel computation of the problems. Alternatively, or in addition, some simultaneously-represented problems may be executed sequentially (e.g., by setting sequential annealing schedules for different problems), thereby allowing for execution of the problems without an intervening re-initialization of the analog processor. Either instance results in improvement in the efficiency of operation of the analog processor.

There may be challenges to implementing such parallel computation on an analog processor. For example, different problems may be of different sizes (and/or connectivity), be executed at different physical temperatures, have different annealing schedules (e.g., some problems may execute in 1 ms, whereas others might execute in 20 ms—twenty times longer!), be executed a different number of times (e.g., to produce a particular number of samples), and/or have other distinguishing characteristics which may pose obstacles to efficient parallel computation. Such obstacles may be particularly pronounced for analog processors that have fixed/limited size (and/or connectivity), require significant time to change temperatures, and/or require significant preprocessing (and/or initialization) to embed and execute a new problem graph.

Figure 16:
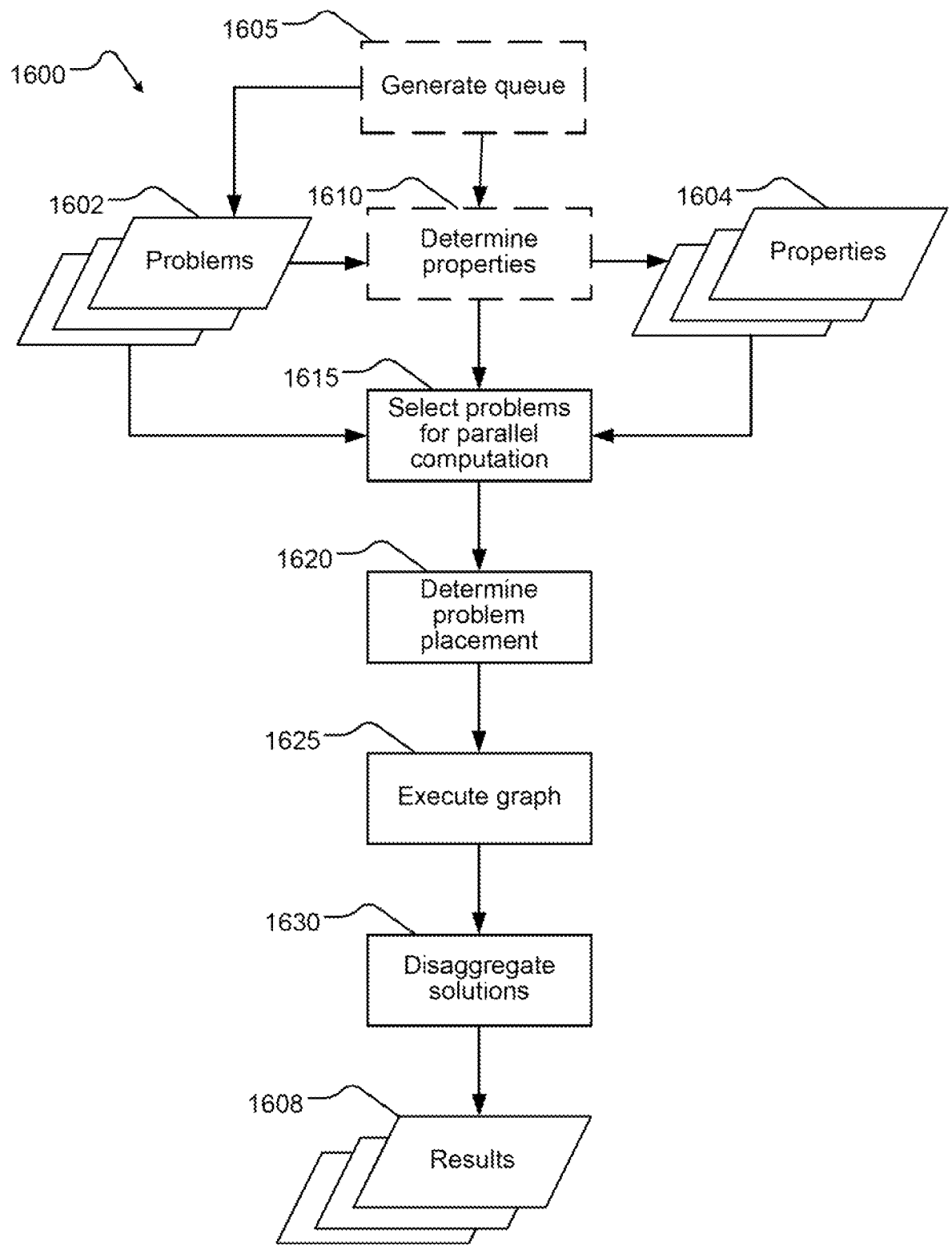
FIG. 16 is a flow diagram that shows an exemplary method for parallel computation using an analog processor.

FIG. 16 shows an exemplary method 1600 for parallel computation using an analog processor, such as a quantum processor. The method involves executing at least a subset of problems in problem queue 1602. Problems in Zproblem queue 1602 may be provided by a user and/or may be generated by a computing system; for example, problem queue 1602 may comprise sub-problems generated by partitioning (e.g., as described above). The problems may comprise any suitable problem representation; for example, the problems may comprise quadratic unconstrained binary optimization problems (aka "QUBOs"), graphical representations (e.g., a problem graph or an embedded graph), and/or other representations. Graphical representations may be represented on a virtual graph (e.g., on full-yield, enlarged, and/or higher-connectivity virtualizations of a hardware graph and/or a subset thereof, as described above) and/or as embedded problems in a hardware graph of the analog processor.

The term "queue" here is used for convenience and is not used to imply any particular data structure—queue 1602 may comprise (for example) a FIFO queue, a heap, an array, and/or any other suitable representation of the problems. Queue 1602 may be maintained by the same and/or a different computing system as the system performing method 1600. The problems of queue 1602 may be submitted by one or more users at one or more times across one or more submissions.

In some implementations, queue 1602 is generated at 1605 by receiving a set of problems and, for each problem, finding a subgraph of the analog processor's hardware graph (and/or of the placement graph, defined below) that can contain the problem. Act 1605 may comprise optimizing to find the smallest such subgraph (and/or an approximation thereof). The graphical representation of the problem may then be added to the queue 1602 (e.g., to the back of a FIFO queue 1602).

The problems of queue 1602 are associated with properties 1604. These properties may be predetermined (e.g., by a queue manager when problems are submitted to queue 1602) and/or may optionally be determined at 1610. Properties 1604 for a given problem in queue 1602 may comprise a size of the problem (e.g., a number of edges, a number of vertices, and/or a diameter of a problem graph), a temperature at which the problem is to be computed (e.g., 0.01° K), a number of samples to produce from the problem, an annealing schedule for the problem (if the analog processor implements annealing), a position of the problem in queue 1602, and/or a priority of the problem.

At 1615, the computing system selects a plurality of problems for parallel computation from queue 1602. In some implementations, selecting a plurality of problems comprises selecting a first problem (e.g., by selecting the frontmost element of queue 1602, by selecting a highest-priority element of queue 1602, by selecting an element with an associated temperature nearest to the current temperature, and/or some combination of these and/or other factors) and querying the queue for other problems with complementary properties 1604. For example, in some implementations the computing system selects the frontmost problem of queue 1602 which satisfies certain selection criteria based on properties 1604, e.g., problems having the same temperature, overall annealing time, and/or number of samples as the first-selected problem. In some implementations, the computing system may greedily select the smallest (and not necessarily frontmost) problem which satisfies the selection criteria.

The selection of act 1615 may be iteratively repeated to select further elements of plurality of selected problems. On subsequent iterations the selection may further be restricted to problems having a size which is small enough to be accommodated by the remaining space of the hardware graph (and/or a virtual graph extending the hardware graph) after placing the previously-selected problems. The selection of 1615 may be repeated until no other problems in queue 1602 are eligible for selection (e.g., because none are small enough to fit into the remaining space of the hardware or virtual graph).

In some implementations, act 1615 comprises generating problem clusters from the problems of queue 1602, for example using a clustering algorithm, such as (for example) K-means, fuzzy C-means, hierarchical clustering, mixture of Gaussians, and/or any other suitable clustering algorithm. Clusters may be determined based on a distance metric defined over at least a subset of the properties; for instance, for a given pair of problems, the distance metric may be based on a difference between the problems' overall annealing times, temperatures, sizes, priorities, and/or number of samples. In some implementations, one or more properties, such as temperature, may act as partitioning functions so that each cluster contains only problems with the same value for those properties.

Once clusters have been identified, a cluster may be selected to form the plurality of selected problems for parallel computation based on the properties of one or more of its constituent problems. For example, a cluster may be selected based on containing the frontmost problem (and/or highest-priority problem) of queue 1602 may be selected, the cluster having the highest mean priority may be selected, a cluster having a (mean) temperature closest to the current temperature of the analog processor may be selected, and/or based on other characteristics of the cluster (e.g., based on other properties of problems in the cluster). The clustering algorithm may be repeated when all clustered problems have been executed, each time a problem is added to queue 1602, each time a cluster is exhausted, prior to each execution by the analog processor, and/or at any other suitable time. In some implementations, clusters are updated when new problems are added to queue 1602 (e.g., by adding the new problems to the nearest previously-identified clusters) without necessarily reiterating the clustering algorithm.

Act 1615 may be interleaved (or otherwise executed alternately and/or in parallel) with determination of problem placement 1620, where selected problems are placed on a hardware graph of the analog processor and/or a virtual graph extending the hardware graph (e.g., such as an enlarger, higher-connectivity, or other graph, such as those as described above). Without loss of generality, this graph will be referred to herein as a "placement graph". While space remains for problems to be added, each selected problem may be placed in a region of the placement graph which is unoccupied by other problems. In implementations where 1616 does not precisely determine whether a problem will fit in the placement graph after adding previously-selected problems, determination of problem placement 1620 may comprise rejecting problems which will not fit and replacing them in queue 1602 (e.g., at the front). For example, if clustering was used to select the plurality of problems, the problems may be selected for placement from within the cluster based on some criteria (e.g., the criteria for iterative selection of individual problems described above).

In some implementations, placement of a problem 1620 involves moving a previously-placed problem to a different region and placing the currently-selected problem into at least part of the vacated space. In implementations where the placement graph has a regular topology (e.g., a Chimera graph), such placement may involve taking a Chimera-structured representation of the problem being placed and shifting it to an empty region of the appropriate size. The selection of a region may be done greedily, heuristically, and/or via any other approach.

In some implementations, the computing system may place problems in the placement graph by executing a graph optimization algorithm, such as cliquer (see P. Ostergard, *Cliquer—routines for clique searching*, available at https://users.aalto.fi/~pat/cliquer.html).

Figure 17A:
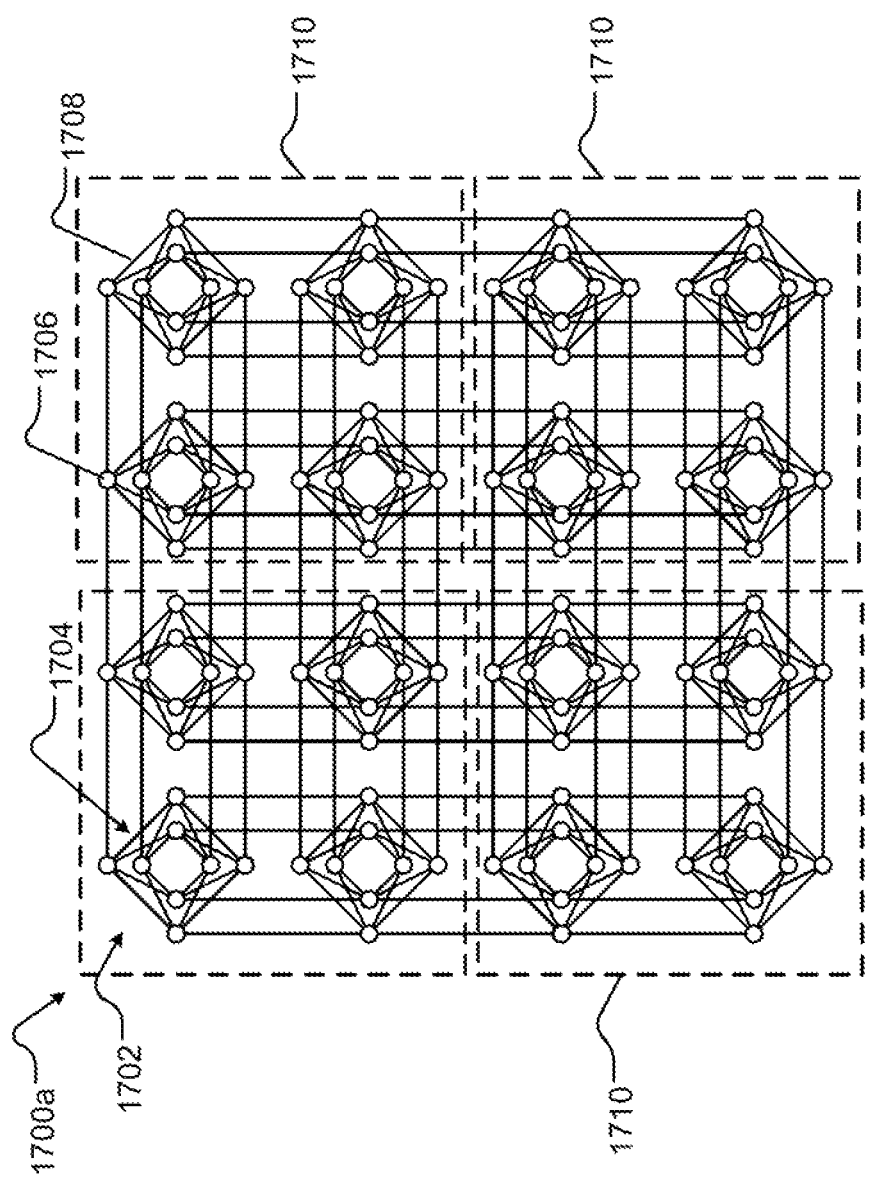
FIGS. 17A and 17B are schematic diagrams that show example placement graphs.
Figure 17B:
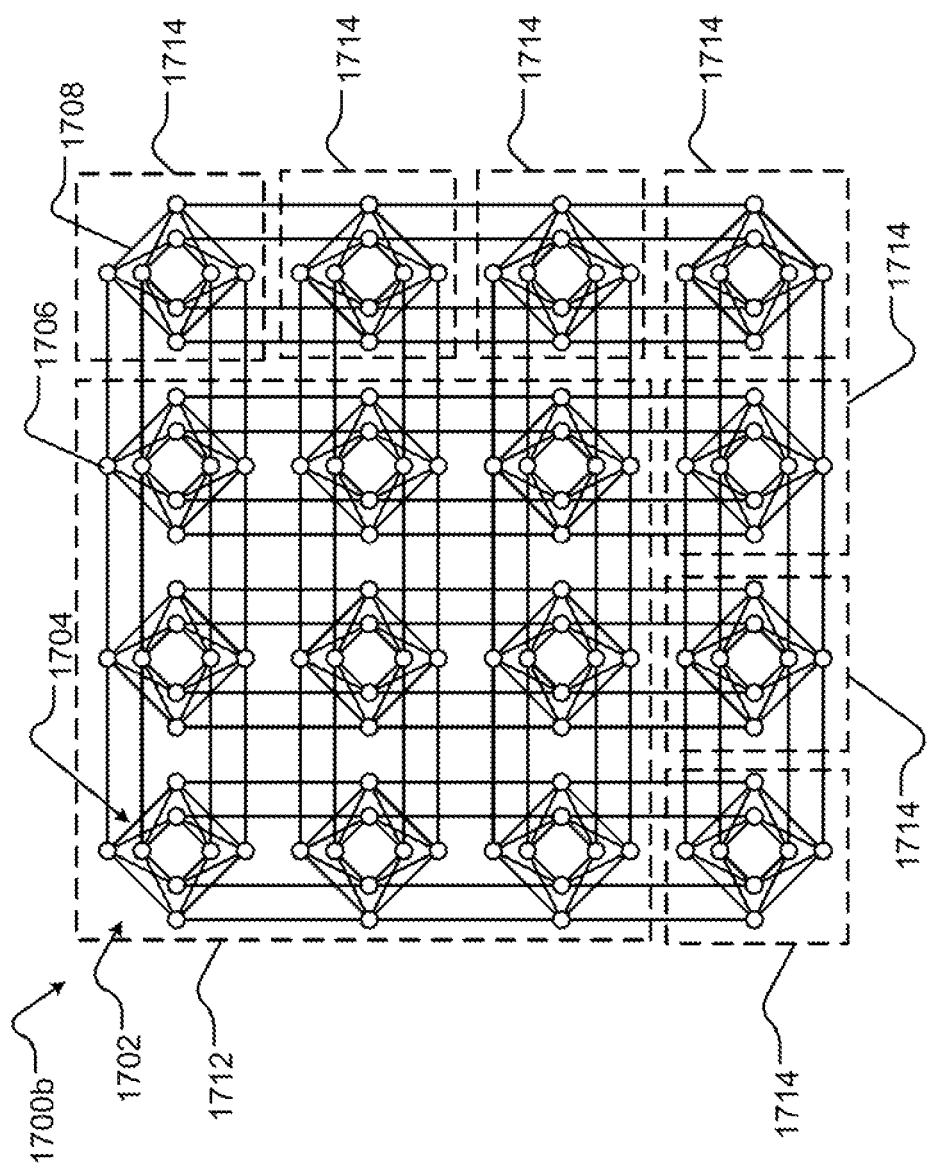

FIGS. 17A and 17B (collectively and individually "FIG. 17") show schematically example placement graphs 1700a and 1700b. Each of these example placement graphs comprises a "full-yield" Chimera graph 1702 having regularly-tiled, bipartite unit cells 1704 comprising qubits 1706 and couplers 1708. Graph 1702 may be virtual; for example, the corresponding hardware graph may be missing one or more qubits 1706 and couplers 1708. In placement graph 1700a, four problems are represented, each having a subgraph which fits inside a 2-unit-cell-by-2-unit-cell region 1710 (sometimes referred to as a "C2" subgraph). In placement graph 1700a, eight problems are represented, one having a subgraph which fits inside a 3-unit-cell-by-3-unit-cell region 1712 (sometimes referred to as a "C3" subgraph) and the other seven fitting inside 1-unit-cell regions (sometimes referred to as a "C1"subgraph"). These examples are non-limiting; in particular, placement graphs are not necessarily Chimera-structured, they are not necessarily virtual graphs, and the boundaries of regions 1710, 1712, 1714 do not necessarily need to fall along unit cell boundaries (i.e., different qubits in a unit cell may belong to different regions).

Returning to FIG. 16, at 1625, the computing system submits the placement graph (including the problems placed thereon at 1620) to the analog processor. Where the placement graph is a subgraph of the hardware graph, this may be done by generating machine instructions corresponding to the values of the graph (i.e. the values of its vertices and edges). Where the placement graph is not a subgraph of the hardware graph (e.g. where it is a virtual graph corresponding to a full-yield virtualization of the hardware graph, an enlarged hardware graph, a highly-connected version of the hardware graph, and/or another virtual graph at least partially executable by the analog processor in one or more computations), it may be executed by any suitable methods, such as (but not limited to) methods described elsewhere herein for solving virtual graphs. Such execution may comprise postprocessing by a digital processor.

At 1630, the results of the execution are communicated from the analog processor to a digital processor and disaggregated. Disaggregation may comprise, for example, reading the output of the analog processor, dividing the output into subgraphs which correspond to the problem subgraphs placed in the placement graph, and associating output values (e.g., spins) of hardware qubits (and, optionally, couplers) in each subgraph with their corresponding vertices (and, optionally, edges) in the corresponding problem subgraph, thereby providing a set of results 1608. Each subgraph of output values in results 1608 may then be treated as a result from an analog processor having the topology of the subgraph, without necessarily requiring any knowledge of the other problems represented on the same placement graph (or their associated results).

In implementations where the placement graph is not itself a subgraph of the hardware graph, the output of the analog processor may be post-processed to generate a virtual output graph with vertices and edges that correspond to those of the placement graph prior to disaggregation.

In some implementations, method 1600 comprises computing a one or more variations of a problem. Variations of a problem may include, for example, spin reversal transformations, modified annealing schedules, and/or other modifications or transformations of the problem. For instance, in some circumstances it is desirable to execute multiple variations of a problem (especially where the problem has an Ising/QUBO structure), with each variation being subject to a spin reversal transformation on or more qubits (see, for example, K. Pudenz, *Parameter Setting for Quantum Annealers*, arXiv:1711.07552v1 (November 2017)). As another example, in some circumstances it is desirable to execute a problem multiple times with different annealing schedules as part of determining an optimal (or near-optimal) annealing schedule. If the size of the problem is smaller than the size of the placement graph, method 1600 may comprise placing one or more variations of the same problem on the same graph, with each variation being subject to a spin reversal transformation, a modified annealing schedule, and/or some other modification or transformation.

In suitable circumstances, this can provide a substantial speedup over implementations where each spin reversal transformation variation is computed using an independent execution of the analog processor. For example, if a user has requested that a problem represented by a C2 subgraph be subjected to 100 spin reversal transforms, then a C12-sized placement graph (i.e. a 12-unit-cell-by-12-unit-cell Chimera-structured graph) can fit 36 variations of the problem, thereby requiring only three executions to compute all 100 variations, rather than 100 executions.

In some implementations, method 1600 comprises performing a mini-batching technique. Mini-batching is a technique used, for example, in machine learning algorithms faced with large-scale dataset, where the dataset is divided into small batches and parameters of the model are updated on a batch-by-batch basis. If the machine learning model is small enough to be represented multiple times on the placement graph, problem queue 1602 of method 1600 may comprise instantiations of the model, each instantiation using a data element from the dataset as input. For instance, each instantiation may comprise a restricted Boltzmann machine generated from a data element from the dataset using the model. A reduced number of executions (potentially as few as a single execution) may then be performed to generate one mini-batch. Alternatively, or in addition, problem queue 1602 may comprise different models to be trained in parallel (on the same or different data).

Hybrid Computing Systems

The present systems and methods may be implemented by, for example, a hybrid computing system comprising a digital computer (or any other non-analog computer as described elsewhere herein) coupled to a quantum computer. In some embodiments, the analog computer comprises a quantum computer comprising a quantum processor, and the quantum computer's computation devices comprise qubits. U.S. provisional patent application Ser. No. 62/114,406 describes example hybrid computing systems in greater detail. For the sake of convenience, the following disclosure refers generally to "qubits" and "quantum processors", although those skilled in the art will appreciate that this disclosure may be implemented in systems comprising other analog processors.

Figure 13:
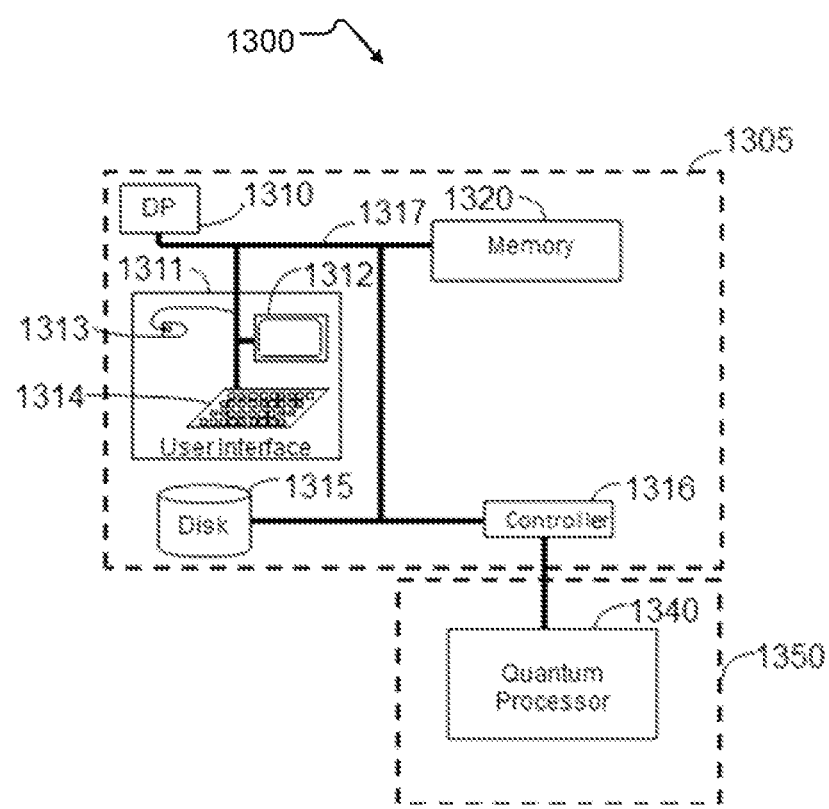
FIG. 13 is a block diagram of a hybrid computing system in accordance with the present systems, devices, articles, and methods, according to at least one implementation.

FIG. 13 is a block diagram of a hybrid computing system 1300 in accordance with the present systems, devices, articles, and methods, according to at least one implementation. Hybrid computing system 1300 comprises a digital computer 1305 coupled to an analog computer 1350. In some implementations, analog computer 1350 is a quantum computer and digital computer 1305 is a classical computer. The exemplary digital computer 1305 includes one or more digital processors (DP) 1310 that may be used to perform classical digital processing tasks described in the present systems and methods.

Digital computer 1305 may include at least one system memory 1320, and at least one system bus 1317 that couples various system components, including system memory 1320 to digital processors 1310.

Each of digital processors 1310 may be any logic processing unit, such as one or more central processing units ("CPUs"), graphics processing units ("GPUs"), digital signal processors ("DSPs"), application-specific integrated circuits ("ASICs"), field-programmable gate arrays ("FPGAs"), etc. Unless described otherwise, the construction and operation of the various blocks shown in FIG. 13 are of conventional design. As a result, such blocks need not be described in further detail herein, as they will be understood by those skilled in the relevant art.

Digital computer 1305 may include a user input/output subsystem 1311. In some implementations, the user input/output subsystem includes one or more user input/output components such as a display 1312, mouse 1313, and/or keyboard 1314. System bus 1317 can employ any known bus structures or architectures, including a memory bus with a memory controller, a peripheral bus, and a local bus. System memory 1320 may include non-volatile memory, such as read-only memory ("ROM"), static random access memory ("SRAM"), Flash NAND; and volatile memory such as random access memory ("RAM") (not shown), all of which are examples of nontransitory computer- or processor-readable media. An basic input/output system ("BIOS") 1321, which can form part of the ROM, contains basic routines that help transfer information between elements within digital computer 1305, such as during startup.

Digital computer 1305 may also include other non-volatile memory 1315. Non-volatile memory 1315 may take a variety of forms, including: a hard disk drive for reading from and writing to a hard disk, an optical disk drive for reading from and writing to removable optical disks, and/or a magnetic disk drive for reading from and writing to magnetic disks, all of which are examples of nontransitory computer- or processor-readable media. The optical disk can be a CD-ROM or DVD, while the magnetic disk can be a magnetic floppy disk or diskette. Non-volatile memory 1315 may communicate with digital processor via system bus

1317 and may include appropriate interfaces or controllers 1316 coupled to system bus 1317. Non-volatile memory 1315 may serve as long-term storage for computer- or processor-readable instructions, data structures, or other data (also called program modules) for digital computer 1305.

Although digital computer 1305 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc., all of which are further examples of nontransitory computer- or processor-readable media. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In Line Memory Modules.

Various sets of computer- or processor-readable instructions (also called program modules), application programs and/or data can be stored in system memory 1320.

In the various implementations, system memory 1320 may store generative learning instructions. For example, generative learning instructions in system memory 1320 can implement the methods like those described in reference to FIGS. 1 through 12 on digital processors 1310 and/or analog computer 1350.

In the various implementations, system memory 1320 may store runtime instructions to provide executable procedures and parameters to deploy and/or monitor generative learning methods.

While shown in FIG. 13 as being stored in system memory 1320, the instructions and/or data described above can also be stored elsewhere including in non-volatile memory 1315 or one or more other non-transitory computer- or processor-readable media.

Analog computer 1351 includes an analog processor 1340 such as a quantum processor. Quantum processor 1340 can include programmable elements such as qubits, couplers, and other devices. Quantum processor 1340 can include superconducting qubits.

In various implementations, quantum processor 1340 performs quantum annealing and/or adiabatic quantum computation.

Figure 14:
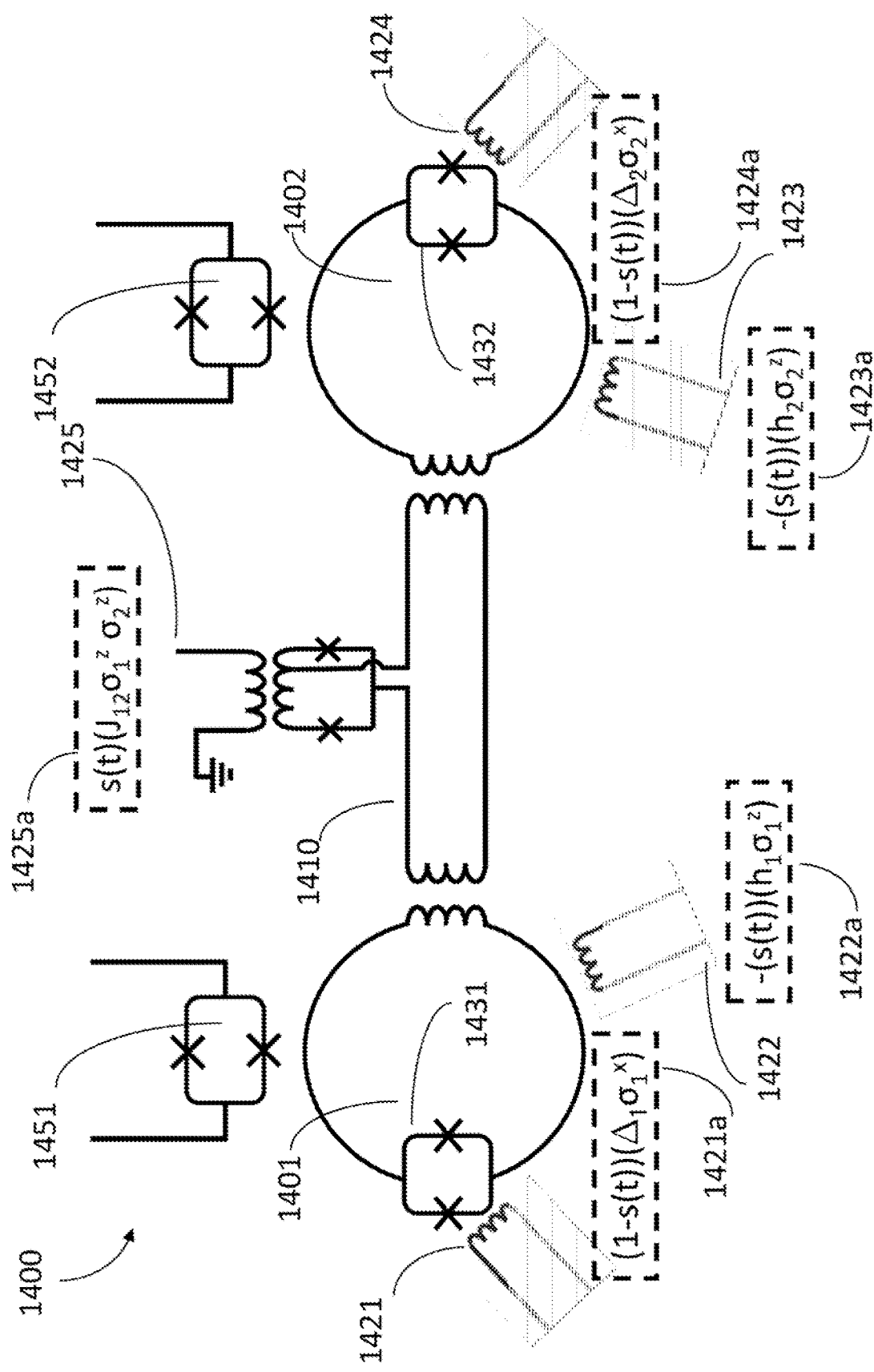
FIG. 14 is a schematic diagram of a portion of an exemplary superconducting quantum processor designed for quantum annealing (and/or adiabatic quantum computing) components from which may be used to implement the present systems and devices.

FIG. 14 is a schematic diagram of a portion of an exemplary superconducting quantum processor 1400 designed for quantum annealing (and/or adiabatic quantum computing) components from which may be used to implement the present systems and devices. The portion of superconducting quantum processor 1400 shown in FIG. 14 includes two superconducting qubits 1401, and 1402. Also shown is a tunable coupling (diagonal coupling terms in the system Hamiltonian, for example between horizontally or vertically arrayed qubits 1401, 1402) via coupler 1410 between qubits 1401 and 1402 (i.e., providing 2-local interaction). While the portion of quantum processor 1400 shown in FIG. 14 includes only two qubits 1401, 1402 and one coupler 1410, those of skill in the art will appreciate that quantum processor 1400 may include any number of qubits and any number of couplers coupling information between them.

The portion of quantum processor 1400 shown in FIG. 14 may be implemented to physically realize quantum annealing and/or adiabatic quantum computing. Quantum processor 1400 includes a plurality of interfaces 1421-1425 that are used to configure and control the state of quantum processor 1400. Each of interfaces 1421-1425 may be realized by a respective inductive coupling structure, as illustrated, as part of a programming subsystem and/or an evolution subsystem. Such a programming subsystem and/or evolution subsystem may be separate from quantum processor 1400, or it may be included locally (i.e., on-chip with quantum processor 1400).

In the operation of quantum processor 1400, interfaces 1421 and 1424 may each be used to couple a flux signal into a respective compound Josephson junction 1431 and 1432 of qubits 1401 and 1402, thereby realizing a tunable tunneling term (the $\Delta_i$ term) in the system Hamiltonian. This coupling provides the off-diagonal $\sigma^x$ terms of the Hamiltonian and these flux signals are examples of "delocalization signals".

In some implementations, the tunneling term is selected to make a first portion of the qubits on the quantum processor more classical relative a second portion of the qubits. For example, qubit 1401 may be a hidden unit in a Boltzmann machine and have a smaller tunneling term relative to qubit 1402.

Similarly, interfaces 1422 and 1423 may each be used to apply a flux signal into a respective qubit loop of qubits 1401 and 1402, thereby realizing the $h_i$ terms in the system Hamiltonian. This coupling provides the diagonal $\sigma^z$ terms in the system Hamiltonian. Furthermore, interface 1425 may be used to couple a flux signal into coupler 1410, thereby realizing the $J_{ij}$ term(s) in the system Hamiltonian. This coupling provides the diagonal $\sigma_i^z \sigma_j^z$ terms in the system Hamiltonian.

In FIG. 14, the contribution of each of interfaces 1421-1425 to the system Hamiltonian is indicated in boxes 1421a-1425a, respectively. As shown, in the example of FIG. 14, the boxes 1421a-1425a are elements of time-varying Hamiltonians for quantum annealing and/or adiabatic quantum computing.

Throughout this specification and the appended claims, the term "quantum processor" is used to generally describe a collection of physical qubits (e.g., qubits 1401 and 1402) and couplers (e.g., coupler 1410). The physical qubits 1401 and 1402 and the coupler 1410 are referred to as the "programmable elements" of the quantum processor 1400 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 1422, 1423, and 1425) used to apply the programmable parameters to the programmable elements of the quantum processor 1400 and other associated control circuitry and/or instructions.

As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 1421 and 1424) used to evolve the programmable elements of the quantum processor 1400 and other associated control circuitry and/or instructions.

For example, the evolution subsystem may include annealing signal lines and their corresponding interfaces (1421, 1424) to the qubits (1401, 1402).

Quantum processor 1400 also includes readout devices 1451 and 1452, where readout device 1451 is associated with qubit 1401 and readout device 1452 is associated with qubit 1402. In some embodiments, such as shown in FIG. 14, each of readout devices 1451 and 1452 includes a DC-SQUID inductively coupled to the corresponding qubit. In the context of quantum processor 1400, the term "readout subsystem" is used to generally describe the readout devices 1451, 1452 used to read out the final states of the qubits (e.g., qubits 1401 and 1402) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 14 illustrates only two physical qubits 1401, 1402, one coupler 1410, and two readout devices 1451, 1452, a quantum processor (e.g., processor 1400) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Figure 15:
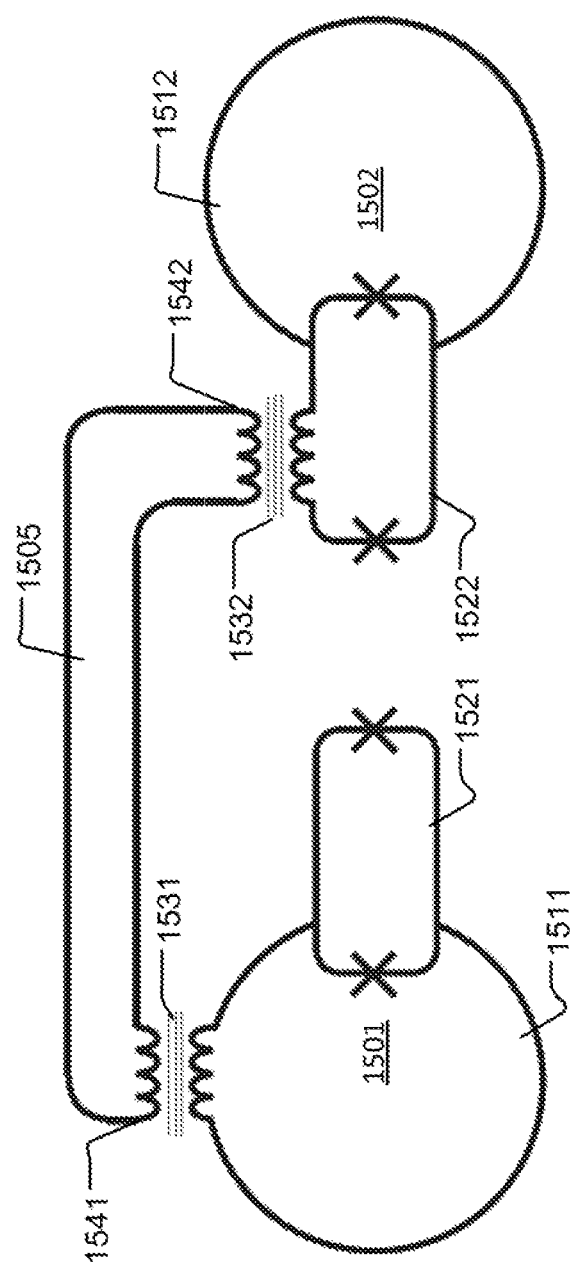
FIG. 15 is a schematic diagram of an embodiment of a system comprising two superconducting flux qubits and a ZX-coupler enabling ZX interactions therebetween.

FIG. 15 is a schematic diagram of an embodiment of a system 1500 comprising two superconducting flux qubits 1501, 1502 and a ZX-coupler 1505 enabling ZX interactions therebetween. Qubit 1501 is comprised of a qubit loop 1511 interrupted by a CJJ 1512, and qubit 1502 is similarly comprised of a qubit loop 1521 interrupted by a CJJ 1522. In the implementation shown in FIG. 15, ZX-coupler 1505 is formed by a closed loop of superconducting material that is inductively coupled to qubit 1501 by the exchange of flux 1531 with the qubit loop 1511 of qubit 1501. ZX-coupler 1505 is also inductively coupled to qubit 1502 by the exchange of flux 1532 with the CJJ 1522 of qubit 1502. ZX-coupler 1505 couples information between the persistent current in the qubit loop 1511 of qubit 1501 and the flux threading the CJJ 1522 of qubit 1502. If qubit 1501 is bistable, then the direction of persistent current flow in qubit loop 1511 may influence the magnitude of the tunneling rate in qubit 1502 by inductive coupling to CJJ 1522 of qubit 1502.

In some implementations, ZX-coupler 1505 may include at least one magnetic flux inductor. In the illustrated implementation of FIG. 15, ZX-coupler 1505 includes two magnetic flux inductors 1541, 1542. Magnetic flux inductor 1541 is positioned proximate the qubit loop 1511 of qubit 1501 to establish a mutual inductance therebetween and realize the exchange of flux 1531. Magnetic flux inductor 1542 is positioned proximate the CJJ 1522 of qubit 1502 to establish a mutual inductance therebetween and realize the exchange of flux 1532. However, those of skill in the art will appreciate that the exchange of flux 1531 and 1532 may be realized, to some degree, without the inclusion of magnetic flux inductors 1541 and 1542. Whether or not magnetic flux inductors 1541 and 1542 are required depends on the magnitude of mutual inductance that is desired in the specific application of ZX-coupler 1505.

ZX-coupler 1505 couples information between the Z-degree of freedom in qubit 1501 and the X-degree of freedom in qubit 1502. Thus, ZX-coupler 1505 provides ZX-coupling between qubits 1501 and 1502. In some embodiments, ZX-coupler 1505 may operate substantially unidirectionally such that information from the Z-degree of freedom in qubit 1501 influences the X-degree of freedom in qubit 1502 with little "back-coupling" from qubit 1502 to qubit 1501.

Those of skill in the art will appreciate that the various components of system 1500 are not drawn to scale and, in particular, their shapes, relative proportions, and relative positions have been adjusted for clarity of illustration.

In many applications, it is desirable to implement tunable coupling between qubits. In accordance with the present systems, methods and apparatus, the ZX-coupling principle taught in FIG. 15 is used to achieve tunable ZX-coupling by accordingly adapting ZX-coupler 1505.

Examples of superconducting qubits include superconducting flux qubits, superconducting charge qubits, and the like. In a superconducting flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like.

The qubits and coupling devices in a quantum processor may be arranged according to an architecture into a topology such that a certain number of qubits may be laid out in a sub-topology of qubits (hereinafter, "sub-topology"). A sub-topology is a portion of a quantum processor topology comprising qubits and coupling devices. A plurality of sub-topologies may be repeated or tiled (or otherwise directly communicatively coupled to one another) over an area of a quantum processor to produce a certain quantum processor topology.

In some implementations, each sub-topology in a topology is identical to each other sub-topology in the same topology. In other implementations, one or more sub-topologies in the topology comprise a different configuration of qubits and coupling devices than another sub-topology in the same topology.

In some circumstances, the classical and quantum portions of these computations may be performed in parallel, for example, when the results of one computation are not used as an initial state for the next computation. Such may potentially allow for the same total number of computations to be performed per unit time as if only quantum computations were performed.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to:

U.S. Pat. No. 7,303,276;
U.S. patent application Ser. No. 14/173,101, filed Feb. 5, 2014, now patent application publication no. 2014-0223224;
International patent application Serial No. PCT/US2015/046393, filed Aug. 21, 2015;
International patent application Serial No. PCT/US2016/015100, filed Jan. 27, 2016;
International patent application Serial No. PCT/US2014/014836, filed Feb. 5, 2014, now WIPO publication number WO2014123980;
U.S. patent application Ser. No. 14/339,289, filed Jul. 23, 2014, now
US Patent Application Publication 2015-0032993;
U.S. patent application Ser. No. 14/340,303, filed Jul. 24, 2014, now patent application publication no. 2015-0032994;
U.S. provisional patent application Ser. No. 61/858,011, filed Jul. 24, 2013;
U.S. provisional patent application Ser. No. 62/040,643, filed Aug. 22, 2014, titled: SYSTEMS AND METHODS FOR PROBLEM SOLVING VIA SOLVERS EMPLOYING PROBLEM MODIFICATION;
U.S. provisional patent application Ser. No. 62/040,646, filed Aug. 22, 2014, titled: SYSTEMS AND METHODS FOR PROBLEM SOLVING VIA SOLVERS EMPLOYING POST-PROCESSING THAT OVERLAPS WITH PROCESSING;
U.S. provisional patent application Ser. No. 62/040,661, filed Aug. 22, 2014, titled: SYSTEMS AND METHODS FOR PROBLEM SOLVING VIA SOLVERS EMPLOYING SELECTION OF HEURISTIC OPTIMIZER(S);
U.S. provisional patent application Ser. No. 62/040,890, filed Aug. 22, 2014, titled: Systems and methods for improving the performance of a quantum processor by correcting to reduce intrinsic/control errors; and
U.S. provisional patent application Ser. No. 62/048,043, filed Sep. 9, 2014, titled: Systems and Methods for Improving the Performance of a Quantum Processor via Reduced Readouts.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation in a computational system, the computational system comprising a quantum processor comprising a plurality of qubits and one or more coupling devices arranged to form a working graph for embedding a problem graph, the computational system further comprising at least one non-quantum processor-based device, the method comprising:
    receiving a plurality of problems, each problem representable as a problem graph having a number of decision variables;
    selecting, from the plurality of problems, a first problem based on one of more properties of the first problem;
    selecting, from the plurality of problems, a second problem based on at least one of the one or more properties of the first problem and one or more properties of the second problem;
    determining, for each of the first and the second problems, a placement of the problem graph representing the problem in a placement graph;
    determining an executable representation of the placement graph together with the placements of the first and the second problems, the representation executable by the quantum processor in one or more executions;
    providing the executable representation to the quantum processor for execution;
    receiving, from the quantum processor, an output based on at least one execution of the executable representation by the quantum processor; and
    generating a first solution to the first problem and a second solution to the second problem by disaggregating representations of the first and the second solutions from the output.

2. The method of claim 1 further comprising determining, for each of the plurality of problems, the problem graph for the problem, the problem graph comprising a sub-graph representing the problem in the placement graph and wherein, for each of the first and the second problems, determining a placement of the problem graph comprises determining a placement of the sub-graph in the placement graph.

3. The method of claim 1 wherein selecting the second problem comprises generating a plurality of clusters of problems based on the one or more properties for each of the plurality of problems, selecting a cluster based on the one or more properties of the cluster's constituent problems, and selecting one or more of the cluster's constituent problems based on the one or more properties of at least one of the cluster's constituent problems.

4. The method of claim 1 wherein, for at least one of the first and the second problems, the one or more properties of the problem are selected from the group consisting of: a size of the problem, a temperature at which the problem is to be executed, a number of samples to be obtained from the problem, an annealing schedule of the problem, a position of the problem in a queue, and a priority of the problem.

5. The method of claim 1 wherein selecting the second problem comprises selecting a smallest problem from at least a subset of the plurality of problems.

6. The method of claim 1 further comprising iteratively selecting one or more further problems from at least a subset of the plurality of problems and determining a placement for each of the one or more further problems in the placement graph until at least one of: no more of the one or more further problems are placeable in the placement graph without removing an already-placed problem from the placement graph or placements have been determined for each problem in the at least a subset of problems.

7. The method of claim 6 wherein determining the placement of at least one of the one or more further problems comprises moving the placement of a previously-placed problem from a first region to a second region in the placement graph, wherein the placement of the at least one of the one or more further problems comprises at least part of the first region.

8. The method of claim 1 wherein generating the first and the second solutions comprises:
dividing the output into a plurality of subgraphs, each subgraph corresponding to at least one of the plurality of problems and based on the placement of the corresponding problem's problem graph in the placement graph; and
associating, for each problem graph, one or more output values of one or more of the plurality of qubits in a corresponding subgraph of the respective the problem graph with one or more vertices in the problem graph.

9. The method of claim 1 wherein the second problem is a variation of the first problem.

10. The method of claim 9 wherein the variation comprises a spin reversal transformation.

11. The method of claim 7 further comprising receiving a plurality of data values and a machine learning model, wherein the first problem comprises a first instantiation of the machine learning model with a first one of the plurality of data values and the second problem comprises a second instantiation of the machine learning model with a second one of the plurality of data values.

12. A computational system, comprising:
at least one quantum processor comprising a plurality of qubits and one or more coupling devices arranged to form a working graph for embedding a problem graph;
at least one non-quantum post-processing processor-based device;
at least one processor-based controller communicatively coupled to the at least one quantum processor and the at least one non-quantum post-processing processor-based device, in operation the at least one processor-based controller:
receives a plurality of problems, each problem representable as a problem graph having a number of decision variables;
selects, from the plurality of problems, a first problem based on one of more properties of the first problem;
selects, from the plurality of problems, a second problem based on at least one of the one or more properties of the first problem and one or more properties of the second problem;
determines, for each of the first and the second problems, a placement of the problem graph representing the problem in a placement graph;
determines an executable representation of the placement graph together with the placements of the first and the second problems, the representation executable by the quantum processor in one or more executions;
provides the executable representation to the quantum processor for execution;
receives, from the quantum processor, an output based on at least one execution of the executable representation by the quantum processor; and
generates a first solution to the first problem and a second solution to the second problem by disaggregating representations of the first and the second solutions from the output.

* * * * *